(12) United States Patent
Kubo

(10) Patent No.: US 7,796,216 B2
(45) Date of Patent: Sep. 14, 2010

(54) LIQUID CRYSTAL DISPLAY DEVICE AND ELECTRONIC APPARATUS

(75) Inventor: Masumi Kubo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 776 days.

(21) Appl. No.: 11/085,267

(22) Filed: Mar. 22, 2005

(65) Prior Publication Data

US 2005/0219445 A1 Oct. 6, 2005

(30) Foreign Application Priority Data

Mar. 23, 2004 (JP) ............................. 2004-085584

(51) Int. Cl.
*G02F 1/1333* (2006.01)

(52) U.S. Cl. ...................................... 349/86

(58) Field of Classification Search ....................... None
See application file for complete search history.

(56) References Cited

U.S. PATENT DOCUMENTS

| 5,489,918 | A | * | 2/1996 | Mosier | 345/89 |
| 5,539,546 | A | * | 7/1996 | Koden et al. | 349/86 |
| 5,825,436 | A | * | 10/1998 | Knight | 349/16 |
| 5,877,829 | A | * | 3/1999 | Okamoto et al. | 349/74 |
| 6,211,931 | B1 | * | 4/2001 | Fukao et al. | 349/86 |
| 2003/0048403 | A1 | * | 3/2003 | Satoh | 349/156 |
| 2003/0146893 | A1 | | 8/2003 | Sawabe | |

FOREIGN PATENT DOCUMENTS

| JP | 10-153968 A | 6/1988 |
| JP | 06-059287 | 3/1994 |
| JP | 07-168157 | 7/1995 |
| JP | 07-244293 | 9/1995 |
| JP | 09-138393 | 5/1997 |

(Continued)

OTHER PUBLICATIONS

JP9-197405 corresponds to US 5,877,829 listed above, Jul. 1997.

(Continued)

*Primary Examiner*—David Nelms
*Assistant Examiner*—Lucy P Chien
(74) *Attorney, Agent, or Firm*—Nixon & Vanderhye P.C.

(57) ABSTRACT

The liquid crystal display device of the present invention includes a liquid crystal display panel 2 containing a liquid crystal having an alignment state which is so controlled that: a transmission intensity at an oblique viewing angle is greater than a frontal transmission intensity assuming a frontal transmittance of 1 for a white display and a transmittance of 1 at the oblique viewing angle for a white display; and a first region and a second region coexist in one or multiple picture element regions constituting a pixel, excess brightness occurring at the oblique viewing angle in the first region, no excess brightness occurring at the oblique viewing angle in the second region. The liquid crystal display device also includes a panel, 3, for use in viewing angle property control setting all or part of the second region of the liquid crystal display panel 2 to either a light-blocking state or a light-transmitting state as viewed from an oblique direction. Thus, the structure, although simple, can switch the liquid crystal display panel between narrow viewing angle properties and wide viewing angle properties.

22 Claims, 22 Drawing Sheets

FOREIGN PATENT DOCUMENTS

| | | |
|---|---|---|
| JP | 10-197844 | 7/1998 |
| JP | 11-007045 A | 1/1999 |
| JP | 11-142819 | 5/1999 |
| JP | 2003-315803 | 11/2003 |
| JP | 2004-062094 | 2/2004 |
| WO | WO 01/88605 | 11/2001 |

OTHER PUBLICATIONS

JP2001-324710 corresponds to WO 01/88605 listed above.

* cited by examiner

FIG. 1 (a) WIDE VIEWING ANGLE
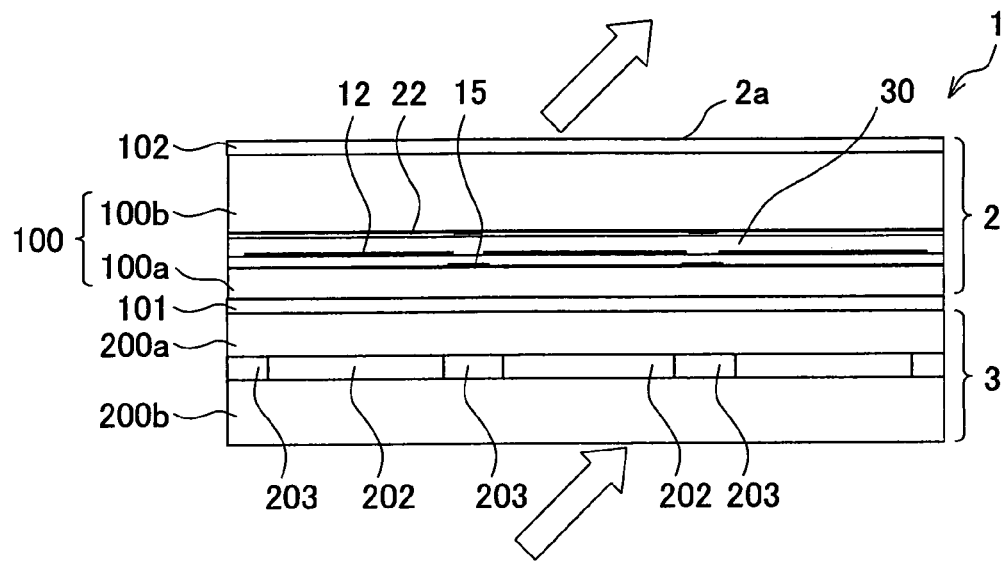
FIG. 1 (b) NARROW VIEWING ANGLE
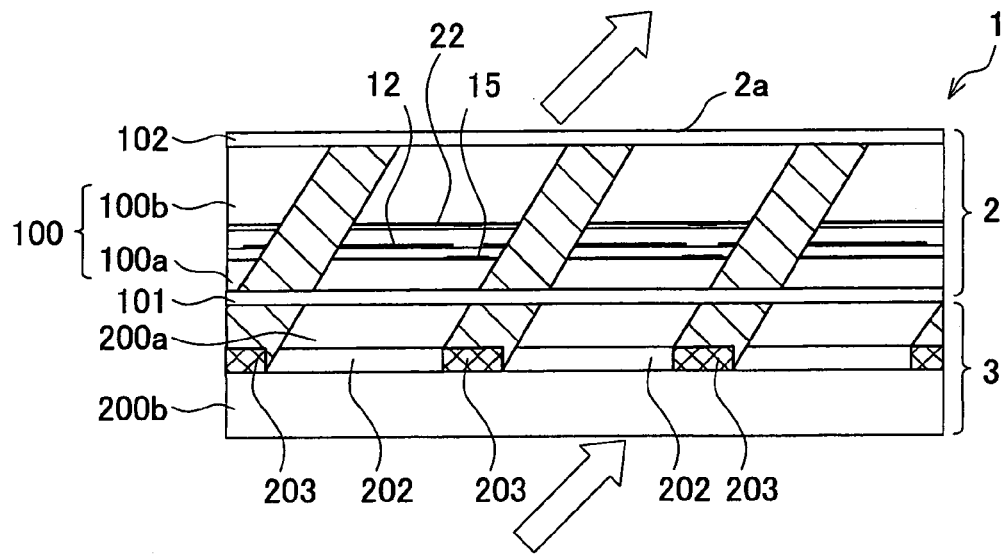

FIG. 17 (a)  RADIAL TILTED ALIGNMENT
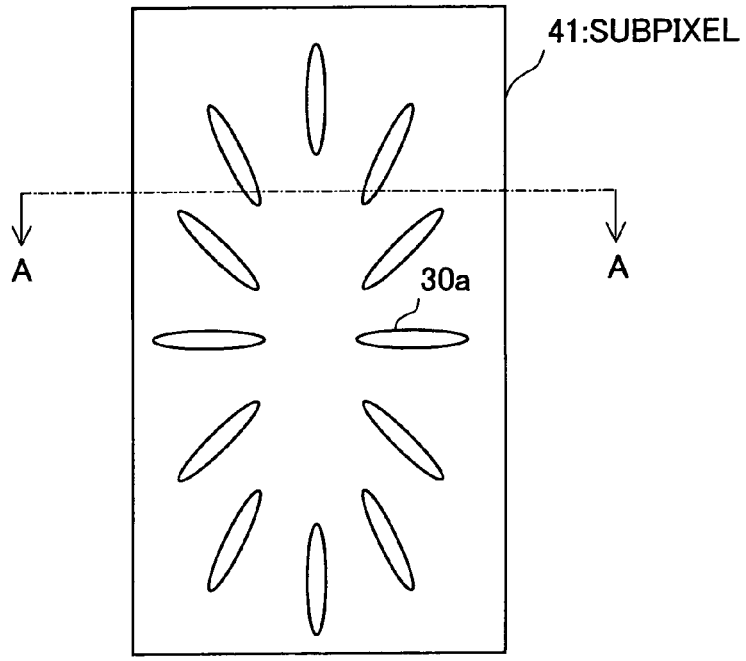
FIG. 17 (b)
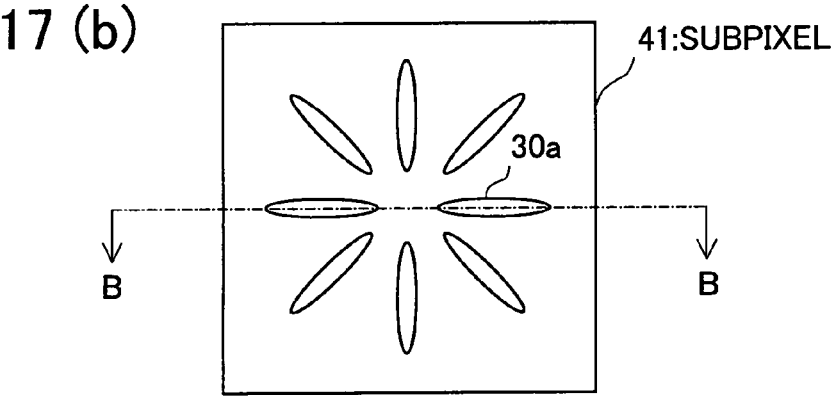
FIG. 17 (c)
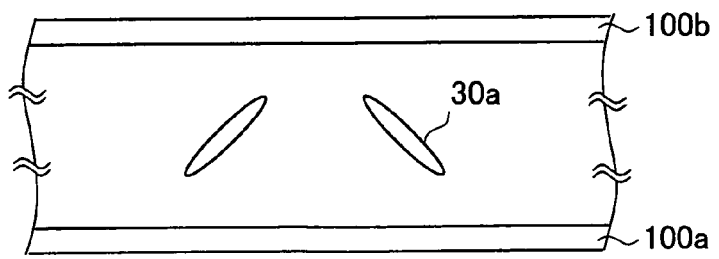

FIG. 18 (a) FOUR-SEGMENT ALIGNMENT
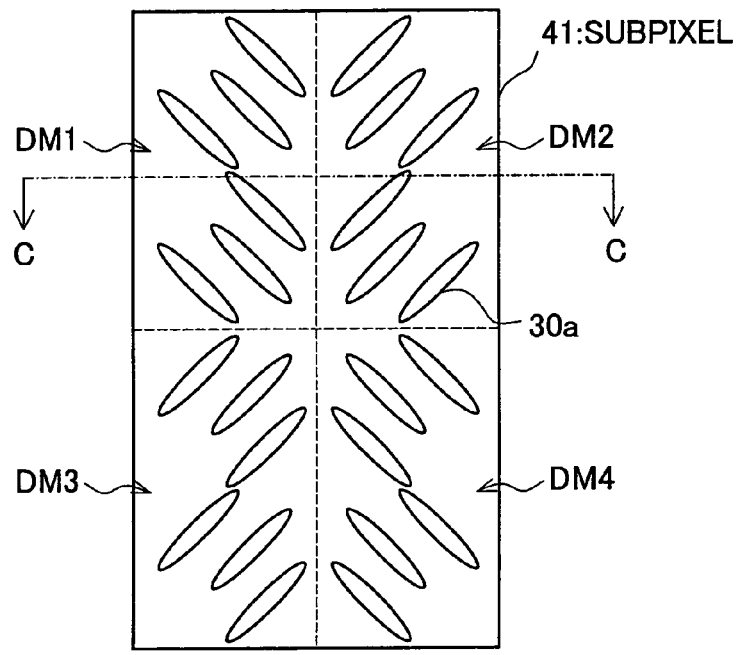
FIG. 18 (b)
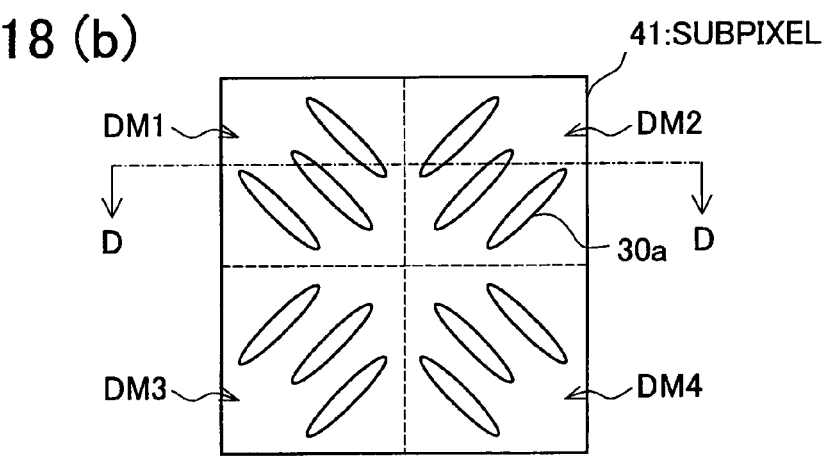
FIG. 18 (c)
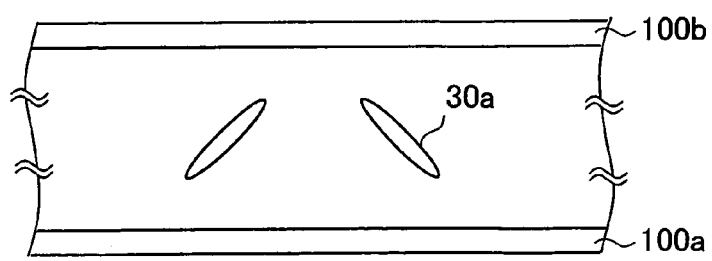

FIG. 19 (a) TWO-SEGMENT ALIGNMENT
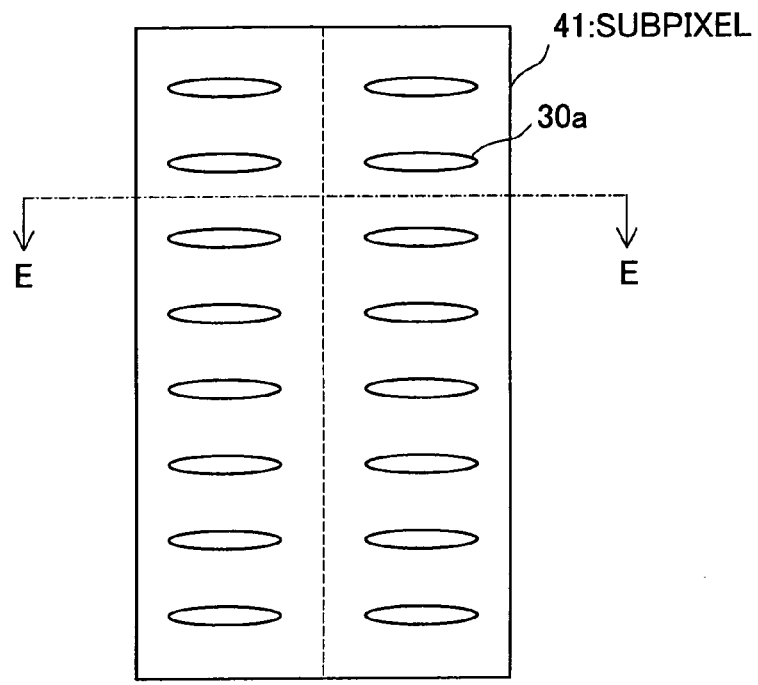
FIG. 19 (b)
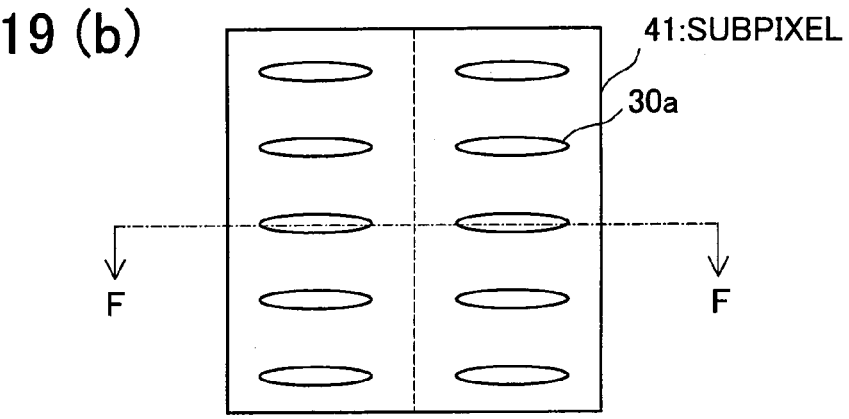
FIG. 19 (c)
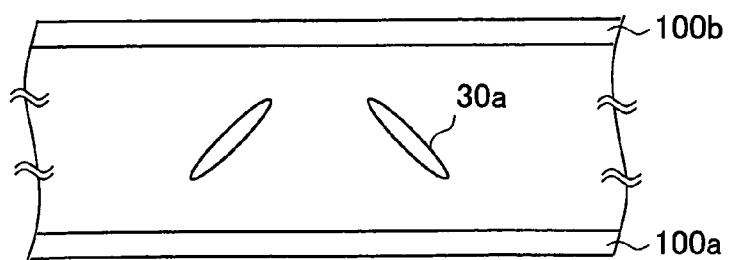

FIG. 20 (a)  FIG. 20 (b)  FIG. 20 (c)
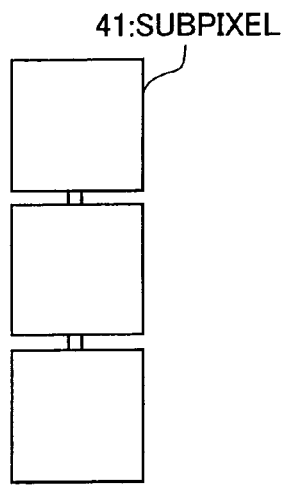
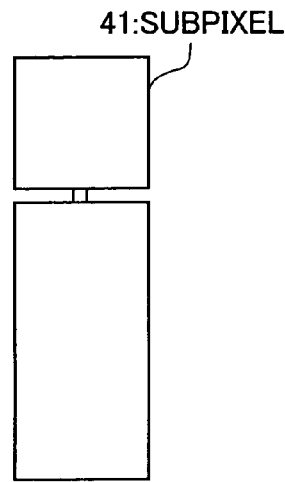
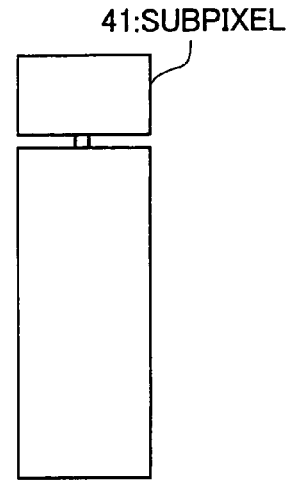
FIG. 20 (d)  FIG. 20 (e)  FIG. 20 (f)
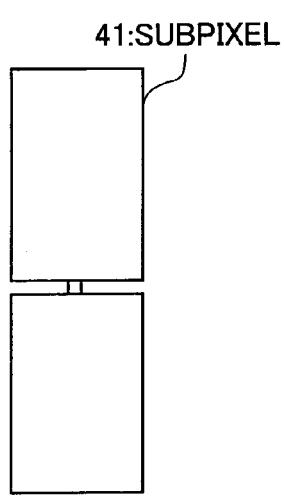
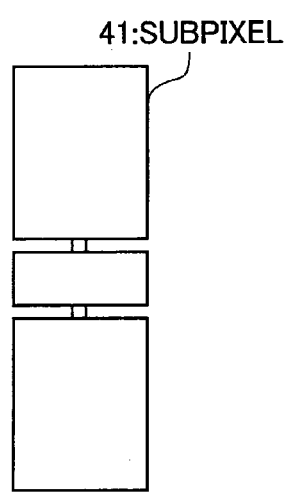
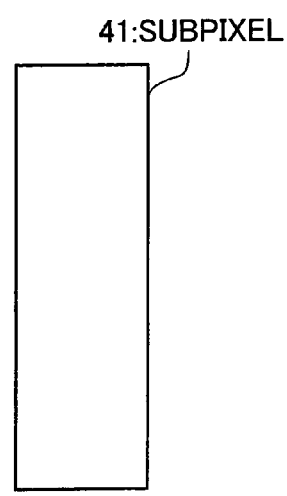

STATAE OF LIGHT SCATTERED
BY RANDOMLY ALIGNED DROPLETS

TRANSPARENT STATAE BY ALIGNED DROPLETS
UNDER APPLIED VOLTAGE

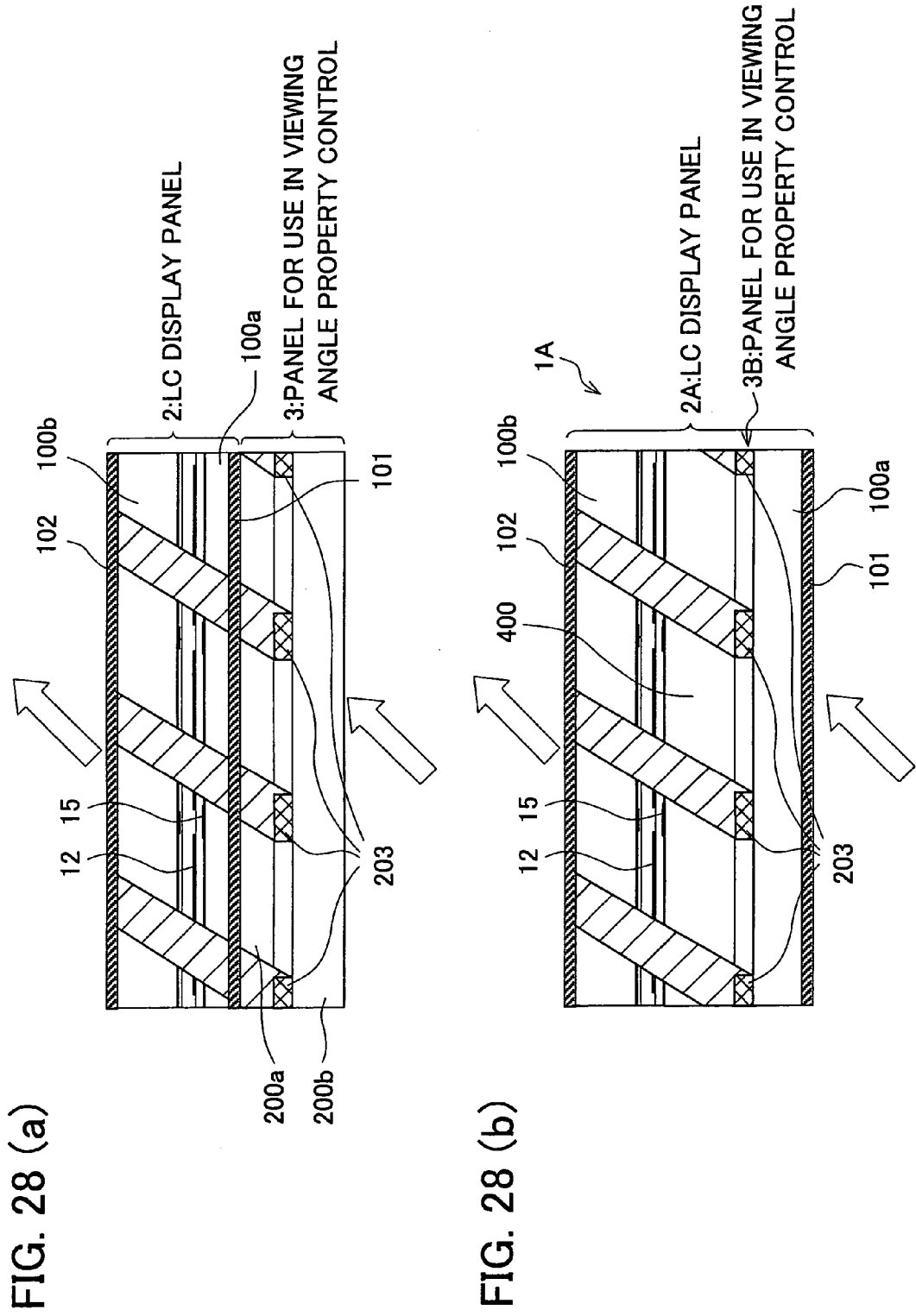

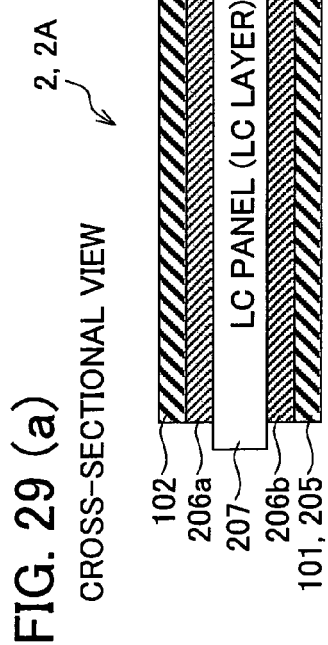
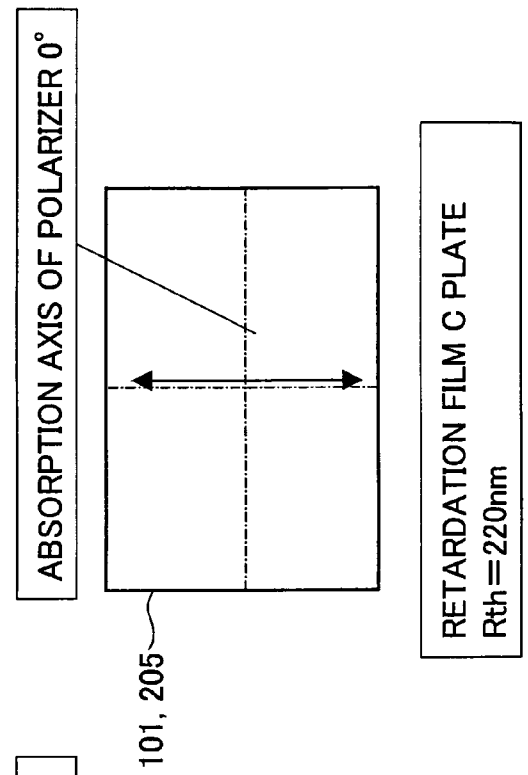
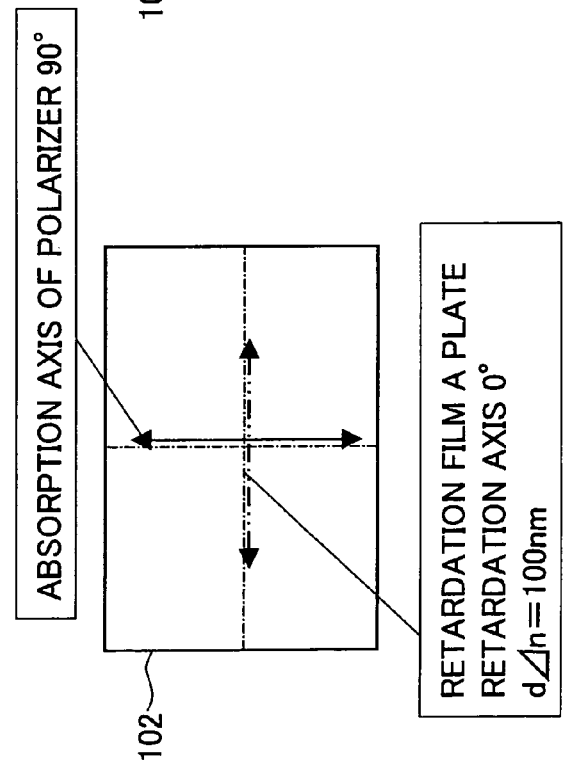
FIG. 29 (a) CROSS-SECTIONAL VIEW
FIG. 29 (b) FRONT POLARIZER
FIG. 29 (c) BACK POLARIZER

LIQUID CRYSTAL DISPLAY DEVICE AND ELECTRONIC APPARATUS

This Nonprovisional application claims priority under 35 U.S.C. §119(a) on Patent Application No. 2004-85584 filed in Japan on Mar. 23, 2004, the entire contents of which are hereby incorporated by reference.

FIELD OF THE INVENTION

The present invention relates to liquid crystal display devices capable of switching between wide viewing angle properties and narrow viewing angle properties and relates also to electronic apparatus including such a display device.

BACKGROUND OF THE INVENTION

A typical active-matrix liquid crystal display device is constructed of two glass substrates fixed to face each other, with liquid crystal being sealed in the gap between them. A transparent common electrode is formed on one of the glass substrates. On the other glass substrate is formed a matrix of many transparent pixel electrodes. Also, circuits are formed which individually apply voltage to the pixel electrodes.

In the liquid crystal display device, the above structure is sandwiched between polarizers to produce a display. Narrow viewing angle properties are therefore one of features of the liquid crystal display device.

To widen the viewing angle properties, liquid crystal display devices are suggested which employ IPS (in-plane switching), MVA (multi-domain vertically aligned), ASV (advance super view), and other modes as physical methods such as divisional alignment.

These liquid crystal display devices with widened viewing angle properties are not applicable to mobile phone and like devices which could allow people beside the user to view the display. Therefore, liquid crystal display devices with narrow viewing angle properties are generally used in such applications.

Meanwhile, recent models of mobile phones not only have telephone and text messaging functions, but also feature image capturing (integrated camera system) and TV broadcast reception. Demands on the display device are changing.

For example, if one uses his mobile phone to make a phone call or send an email, he would want no other people to view the display content on the screen and need a display device with narrow viewing angle properties. On the other hand, when he takes a picture or watches TV, he would neither care about other people viewing the display content on the screen nor need a display device with narrow viewing angle properties. To share the content with other people, he would need a display device with wide viewing angle properties.

To sum it up, with a growing number of functions crammed into the mobile phone, there occurs a need for switching the display device between different sets of viewing angle properties (wide viewing angle properties and narrow viewing angle properties) in accordance with the functions.

Japanese published patent application 10-153968/1998 ("Tokukaihei 10-153968;" published on Jun. 9, 1998), among others, discloses a liquid crystal display device capable of, where necessary, switching the display screen between different sets of viewing angle properties. To achieve the switching, the display device exploits the viewing angle properties of the liquid crystal.

To switch between wide viewing angle properties and narrow viewing angle properties, the Tokukaihei 10-153968 liquid crystal display device divides each pixel into two pixel regions and applies the same drive voltage to the two pixel regions. The grayscale level at oblique viewing angles is thus inverted to obtain narrow viewing angle properties. Applying different drive voltages to the two pixel regions restrain the inversion of the grayscale level at oblique viewing angles to obtain wide viewing angle properties.

However, the Tokukaihei 10-153968 liquid crystal display device still has problems. The display device switchably supplies drive voltages to the two pixel regions in each pixel. The driving control of the liquid crystal display device becomes complex. The circuitry implementing the control also becomes complex.

SUMMARY OF THE INVENTION

The present invention has an objective to provide a liquid crystal display device, of a simple structure, capable of switching between different sets of viewing angle properties and also to provide electronic apparatus including such a display device.

To achieve the objective, the liquid crystal display device in accordance with the present invention is characterized in that it includes a liquid crystal display panel containing a liquid crystal having an alignment state which is so controlled that: a transmission intensity at an oblique viewing angle is greater than a frontal transmission intensity assuming a frontal transmittance of 1 for a white display and a transmittance of 1 at the oblique viewing angle for a white display; and a first region and a second region coexist in one or multiple picture element regions constituting a pixel, excess brightness occurring at the oblique viewing angle in the first region, no excess brightness occurring at the oblique viewing angle in the second region. The liquid crystal display device is characterized also in that it further includes a light-transmitting state setting section setting all or part of the second region to either a light-blocking state or a light-transmitting state as viewed from an oblique direction.

The light-transmitting state setting section sets, for example, the all or part of the second region to either the light-blocking state or the light-transmitting state as viewed from the oblique direction in accordance with a viewing angle property switching signal.

More specifically, the light-transmitting state setting section for example, contains a light-blocking layer switching between a light-blocking state and a light-transmitting state by the application of an electric field.

That is, the light-transmitting state setting section is a light-transmitting state switching section switching the all or part of the second region between the light-blocking state and the light-transmitting state as viewed from an oblique direction, and is adapted so as to switch the all or part of the second region between the light-blocking state and the light-transmitting state as viewed from an oblique direction by, for example, switching between the presence/absence of an applied electric field across the light-blocking layer in accordance with a viewing angle property switching signal.

According to the arrangement, the light-transmitting state setting section sets all or part of the second region where no excess brightness occurs at oblique viewing angles to the light-blocking state as viewed from an oblique direction. This increases those areas where excess brightness occurs at oblique viewing angles in picture element regions. As the areas where excess brightness occurs at oblique viewing angles in picture element regions increase in this manner, the display on the liquid crystal display panel becomes hard to see from oblique directions. This is nothing but the narrowing of the viewing angle properties of the liquid crystal display panel, or imparting narrow viewing angle properties to the liquid crystal display panel.

If the light-transmitting state setting means sets all or part of the second region to the light-transmitting state, excess brightness at oblique viewing angles is reduced. Therefore, the viewing angle properties of the liquid crystal display panel are widened compared with the case where all or part of the second region is set to the light-blocking state.

Therefore, in the picture element region where there coexist the first region where excess brightness occurs at oblique viewing angles and the second region where no excess brightness occurs at oblique viewing angles, the liquid crystal display panel can be rendered to have narrow viewing angle properties or wide viewing angle properties by setting at least part of the second region where no excess brightness occurs at oblique viewing angles to either the light-blocking state or the light-transmitting state.

That is, according to the present invention, the light-transmitting state setting section can alter the ratio of the first region where excess brightness occurs at oblique viewing angles to the second region where no excess brightness occurs at oblique viewing angles in one or multiple picture element regions constituting pixels in the liquid crystal display panel in accordance with, for example, a viewing angle property switching signal, so as to narrow or widen the viewing angle properties of the liquid crystal display panel.

Thus, the present invention, unlike conventional art, does not need to divide one pixel into two pixels and drive-control the individual divided pixels independently from the others so as to switch the liquid crystal display panel between different sets of viewing angle properties. The arrangement of the invention enabling the switching of the liquid crystal display panel between different sets of viewing angle properties is simple. As a result of this, a liquid crystal display device can be provided which is capable of switching the liquid crystal display panel between different sets of viewing angle properties through a simple structure.

To achieve the objective, the liquid crystal display device arranged as above may be applied to the mobile phone, PDA (personal digital assistant), digital camera, video camera, or other electronic apparatus with a display device.

In other words, the electronic apparatus of the present invention is characterized in that it is capable of at least two of email, image capture, Internet access, and TV broadcast reception functions, especially, at least one of the Internet access and email functions and at least one of the image capture and TV broadcast reception functions. The apparatus contains a liquid crystal display device producing a display of contents of functions being carried out. The liquid crystal display device includes a liquid crystal display panel containing a liquid crystal having an alignment state which is so controlled that: a transmission intensity at an oblique viewing angle is greater than a frontal transmission intensity assuming a frontal transmittance of 1 for a white display and a transmittance of 1 at the oblique viewing angle for a white display; and a first region and a second region coexist in one or multiple picture element regions constituting a pixel, excess brightness occurring at the oblique viewing angle in the first region, no excess brightness occurring at the oblique viewing angle in the second region. The liquid crystal display device further includes light-transmitting state setting means setting all or part of the second region to either a light-blocking state or a light-transmitting state as viewed from an oblique direction, according to the function which is carried out.

This allows the use of liquid crystal display panel with viewing angle properties suitable for each of the functions, by the light-transmitting state setting means switching the liquid crystal display panel between wide viewing angle properties and narrow viewing angle properties.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 1($a$) is a schematic cross-sectional view of a liquid crystal display device in wide viewing angle property mode in association with an embodiment of the present invention.

FIG. 1($b$) is a schematic cross-sectional view of a liquid crystal display device in narrow viewing angle property mode in association with an embodiment of the present invention.

FIG. 17(a) to FIG. 17(c) show examples of alignment states in a liquid crystal display panel (will be detailed in the present embodiment).

FIG. 18(a) to FIG. 18(c) show other examples of alignment states in a liquid crystal display panel (will be detailed in the present embodiment).

FIG. 19(a) to FIG. 19(c) show further examples of alignment states in a liquid crystal display panel (will be detailed in the present embodiment).

FIG. 20(a) to FIG. 20(f) show an example of the shape subpixels can take in a liquid crystal display panel (will be detailed in the present embodiment).

FIG. 28(a) is an illustration of the position of a panel for use in viewing angle property control in an example where the panel for use in viewing angle property control is provided outside a liquid crystal display panel.

FIG. 28(b) is an illustration of the position of a panel for use in viewing angle property control in an example where a viewing angle property control section is provided inside a liquid crystal display panel.

FIG. 29(a) to FIG. 29(c) are illustrations of how polarizers are set up in the liquid crystal display panel shown in FIG. 27(a) and FIG. 28(b).

DESCRIPTION OF THE EMBODIMENTS

Figure 2:
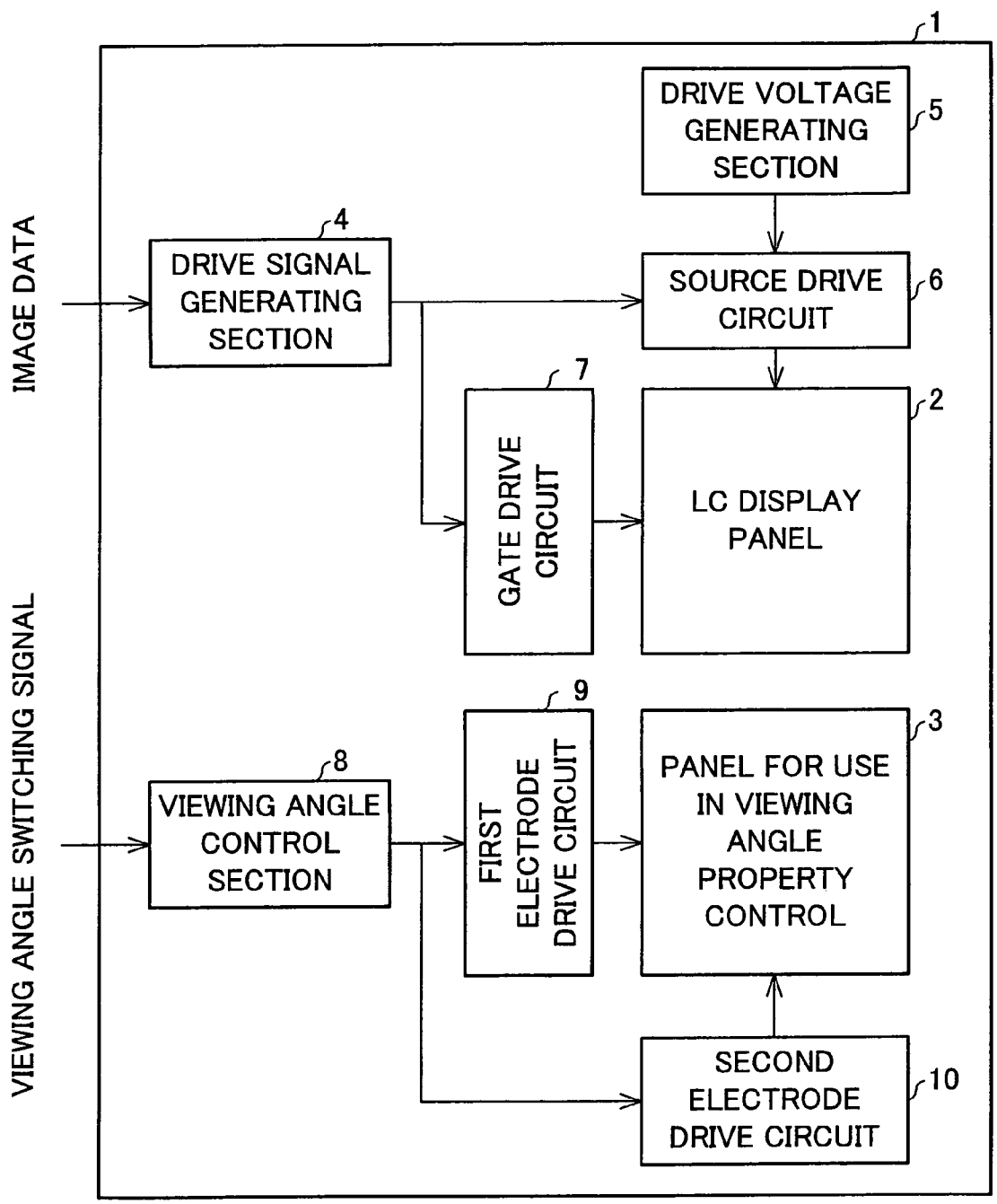
FIG. 2 is a block diagram illustrating the structure of a major part of the liquid crystal display device shown in FIG. 1.

The following will describe an embodiment of the present invention. The embodiment will discuss liquid crystal display devices involving liquid crystal in CPA (continuous pinwheel alignment) mode as its display mode.

A liquid crystal display device 1 of the present embodiment, as shown in FIG. 1(a) and FIG. 1(b), contains a panel, 3, for use in viewing angle property control (light-transmitting state setting means, light-transmitting state setting section, light-transmitting state switching section). The panel 3 is disposed on a surface of the liquid crystal display panel 2 which is opposite a display surface 2a, so as to control the viewing angle properties of the display surface 2a.

The panel, 3, for use in viewing angle property control has a function of switching itself between a light-diffusing state and a light-transmitting state, which in turn switches the display surface 2a of the liquid crystal display panel 2 between different sets of viewing angle properties.

FIG. 1(a) shows the panel, 3, for use in viewing angle property control switched to the light-transmitting state, imparting wide viewing angle properties to the display surface 2a of the liquid crystal display panel 2. FIG. 1(b) shows the panel, 3, for use in viewing angle property control switched to the light-diffusing state (light-blocking state), imparting narrow viewing angle properties to the display surface 2a of the liquid crystal display panel 2.

The panel, 3, for use in viewing angle property control contains a dispersion agent 203 injected as a light-blocking layer right under bus lines (signal lines) 15. The agent 203 is made up of a polymer-dispersed liquid crystal (may be referred to as a "polymer-dispersed LC" and will be detailed later). The bus lines 15 collectively refer to source lines and gate lines through which picture element electrodes 12 in the liquid crystal display panel 2 are driven. The presence/absence of an applied electric field across the liquid crystal in the dispersion agent 203 causes a switching between the light-diffusing state (light-blocking state) and the light-transmitting state.

Thus, FIG. 1(a) shows the dispersion agent 203 being under an applied electric field (wide viewing angle properties). The agent 203 constitutes the light-blocking layer. FIG. 1(b) shows the dispersion agent 203 being under no applied electric field (narrow viewing angle properties). Details will follow as to the control of the viewing angle properties through the presence/absence of an applied electric field across the dispersion agent.

The liquid crystal display device 1, as shown in FIG. 2, contains a drive signal generating section 4, a drive voltage generating section 5, a source drive circuit 6, and a gate drive circuit 7, to drive the liquid crystal display panel 2. The device 1 also contains a viewing angle control section 8, a first electrode drive circuit 9, and a second electrode drive circuit 10, to drive the panel, 3, for use in viewing angle property control.

The liquid crystal display panel 2 is an active matrix display panel with a matrix of pixels. The panel 2 operates as the source drive circuit 6 and the gate drive circuit 7 apply voltages to signal lines (source bus lines and gate bus lines) through which drive signals are supplied to the pixel electrodes (not shown) of the liquid crystal display panel 2. The panel 2 displays images on the basis of incoming image data.

The drive signal generating section 4 is a circuit generating drive signals driving the source drive circuit 6 and the gate drive circuit 7 on the basis of the image data. The generated signals are fed to the source drive circuit 6 and the gate drive circuit 7.

The drive voltage generating section 5 is a circuit generating a drive voltage applied to the liquid crystal display panel 2. The drive voltage (voltage for use in driving) generated in the drive voltage generating section 5 is fed to the source drive circuit 6.

The source drive circuit 6 is a circuit applying voltages to source bus lines (not shown) to drive the liquid crystal display panel 2 according to signals from the drive signal generating section 4 and the drive voltage generated by the drive voltage generating section 5. The source bus lines run vertically in the liquid crystal display panel 2. So, the source bus lines receive voltages according to the signals from the drive signal generating section 4.

The gate drive circuit 7 is a circuit applying active matrix drive voltages to gate bus lines to drive the liquid crystal display panel 2 according to signals from the drive signal generating section 4. The gate bus lines run horizontally in the liquid crystal display panel 2. So, the gate bus lines selectively receive voltages according to the signals from the drive signal generating section 4.

In contrast, the panel, 3, for use in viewing angle property control is a panel switching the display screen of the liquid crystal display panel 2 between different sets of viewing angle properties. Similarly to the liquid crystal display panel 2, the panel 3 includes a lattice of first electrodes (not shown) running horizontally and second electrodes (not shown) running vertically. The structure and manufacturing method of the panel, 3, for use in viewing angle property control will be detailed later.

The viewing angle control section 8, driving the panel, 3, for use in viewing angle property control, externally receives a viewing angle property switching signal. The section 8 produces a control signal controlling viewing angle properties according to the received viewing angle property switching signal. The produced signal is then fed to the first electrode drive circuit 9 and the second electrode drive circuit 10.

The first electrode drive circuit 9 and the second electrode drive circuit 10 select electrodes to which voltages will be applied according to respective received control signals and apply predetermined voltages to the select electrodes.

Figure 3:
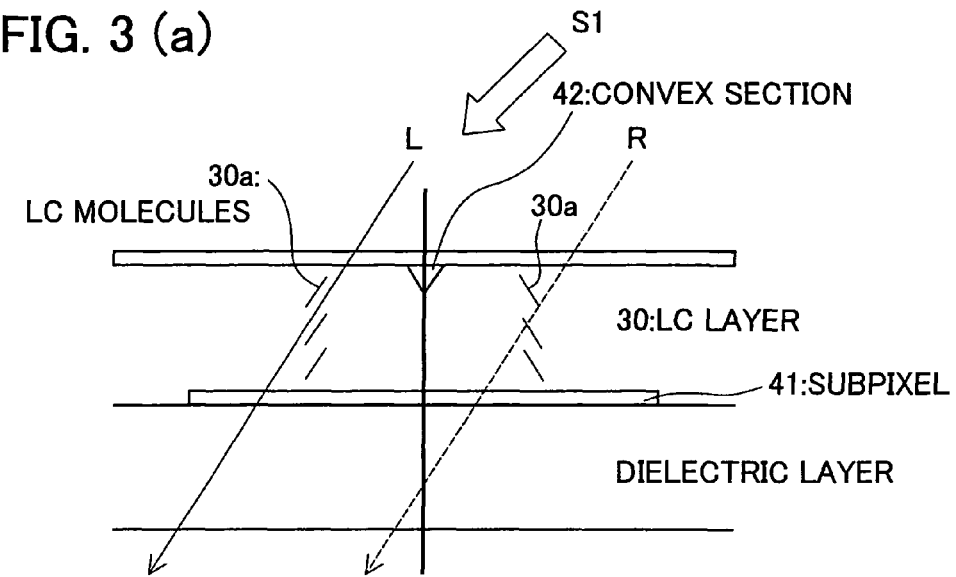
FIG. 3($a$) and FIG. 3($b$) are illustrations representing principles in controlling the viewing angle properties of the liquid crystal display panel.
Figure 3:
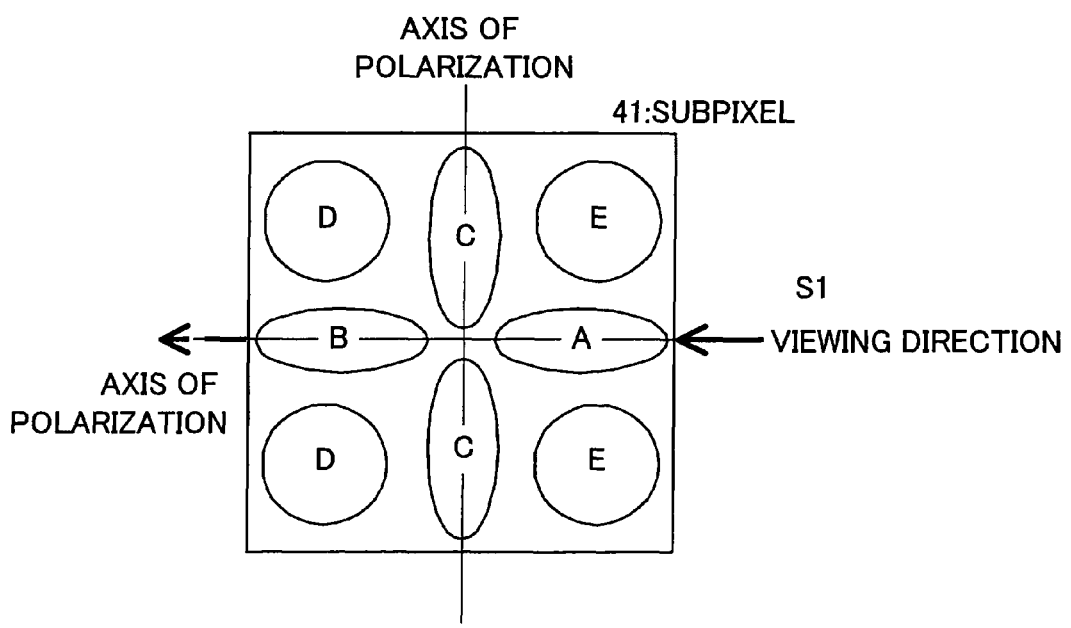

Now, referring to FIGS. 3(*a*), 3(*b*), 4(*a*) and 4(*b*), the following will describe viewing angle property control principles of the liquid crystal display device in accordance with the present invention.

Liquid crystal molecules 30*a* in a liquid crystal layer 30 in FIG. 3(*a*) are aligned as if they fanned out from a convex section 42 in a subpixel 41. Depending on the viewing angle, the liquid crystal molecules 30*a* may block light transmission (see the broken line in the figure). For example, when the liquid crystal layer 30 is viewed from an oblique direction S1, there occur multiple regions with different transmission intensities (region A to region E) in the subpixel 41 as shown in FIG. 3(*b*).

Figure 4:
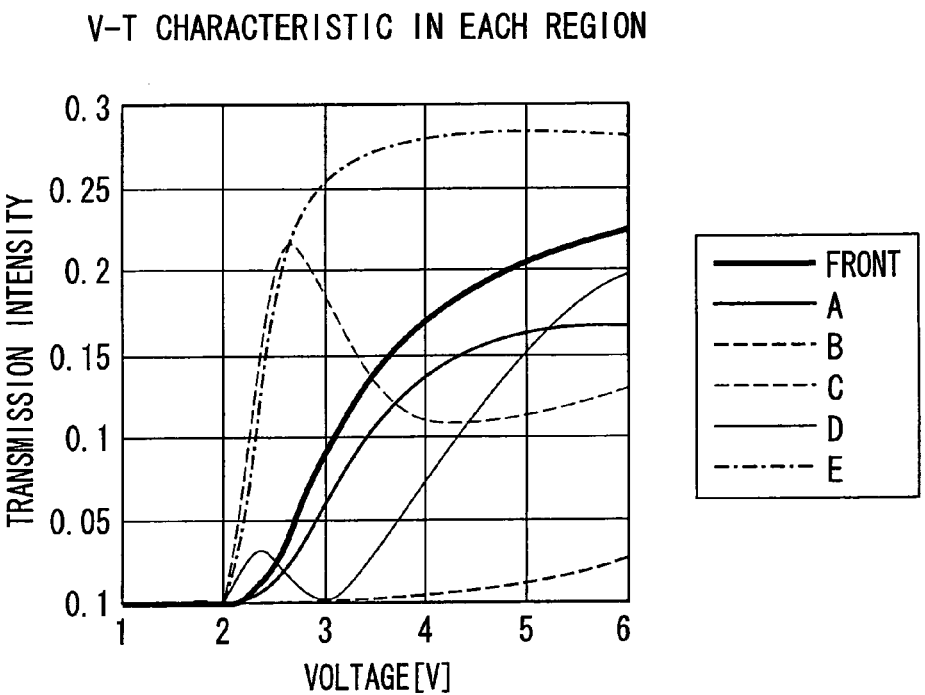
FIG. 4($a$) and FIG. 4($b$) are graphical representations of principles in controlling the viewing angle properties of the liquid crystal display panel.
Figure 4:
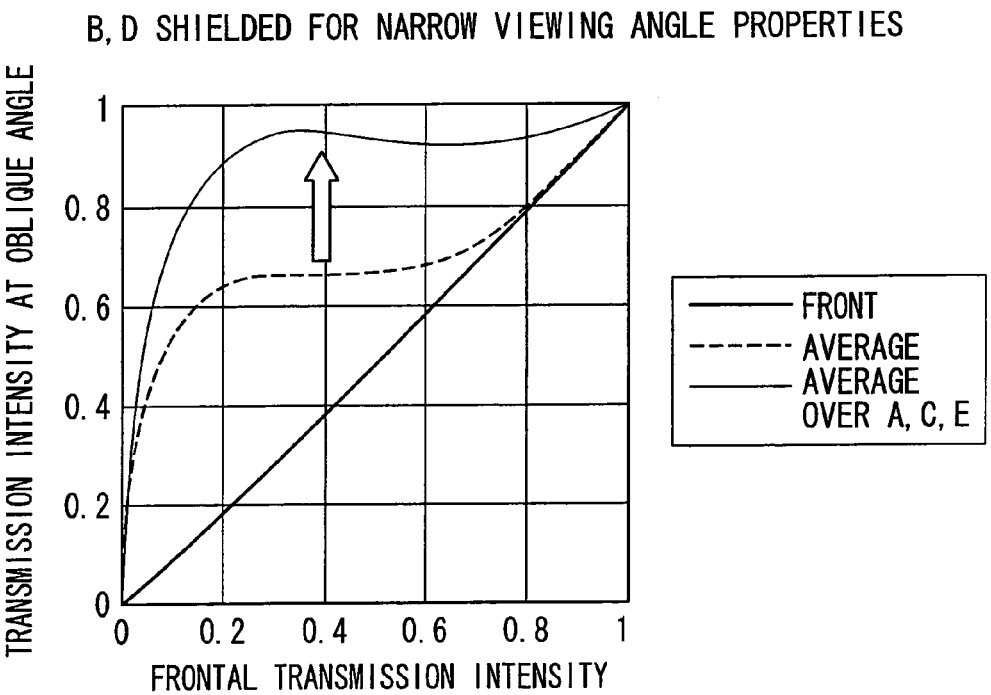

The liquid crystal molecules 30*a* are aligned so that the relationship between voltage and frontal transmission intensity of the liquid crystal layer 30 in these regions would be represented by the graph in FIG. 4(*a*).

Figure 30:
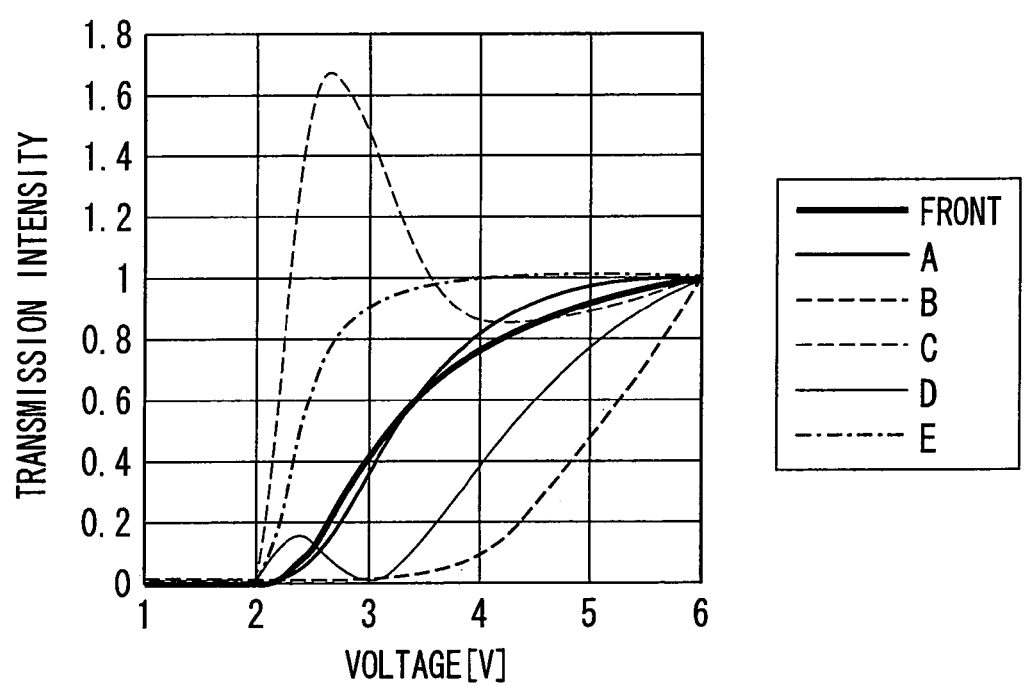
FIG. 30 is a graph of a voltage-transmission intensity characteristic of a subpixel containing liquid crystal molecules aligned as shown in the graph in FIG. 4(a), assuming that the transmission intensity at actual drive white voltage is 1.

Here, in the subpixel 41 containing the liquid crystal molecules 30*a* aligned as in the graph in FIG. 4(*a*), the frontal transmission intensity and a transmission intensity at an oblique angle of 60° (i.e., a polar angle of 60° around the optical axis) have a relationship as represented by the graph in FIG. 4(*b*). FIG. 30 is a graph of a voltage-transmission intensity characteristic of a subpixel 41 containing liquid crystal molecules 30*a* aligned as shown in the graph in FIG. 4(*a*), assuming that the transmission intensity at actual drive white voltage is 1. In FIGS. 4(*a*), 30, the "front" or "frontal" refers to the voltage-transmission intensity characteristic of the liquid crystal panel 2 when it is viewed from the front.

It would be understood from the FIG. 4(*b*) graph that the transmission intensity at the oblique angle of 60° is greater when averaged across the regions A, C, E, with light being blocked by the remaining regions (regions B, D), than when averaged across the all regions (regions A to E). This fact indicates that a severer excess brightness phenomenon occurs at the oblique angle of 60° when light is blocked by the regions B, D than when light is not blocked by the regions B, D. In other words, the blocking of light by the regions B, D helps to achieve narrow viewing angle properties.

In the present embodiment, the excess brightness phenomenon when viewed from an oblique direction refers to a phenomenon where the transmittance in an oblique direction does not fall sufficiently in producing a black display under voltage and causes excess brightness to appear. The region where excess brightness occurs at an oblique viewing angle (the first region) refers to a region where the transmission intensity is higher than the frontal transmission intensity under voltage in the voltage-transmission intensity characteristic assuming that the liquid crystal layer 30 has a transmission intensity of 1 under actual drive white voltage. That is, in the present embodiment, the region where excess brightness occurs at an oblique viewing angle (the first region) specifically refers to a region, like regions C and E, where the voltage-transmission intensity characteristic shows a higher transmission intensity than a frontal transmission intensity in FIG. 30. The region where excess brightness does not occur at an oblique viewing angle (the second region) refers to a region where the transmission intensity is lower than the frontal transmission intensity under voltage in the voltage-transmission intensity characteristic assuming that the liquid crystal layer 30 has a transmission intensity of 1 under actual drive white voltage. That is, in the present embodiment, the region where excess brightness does not occur at an oblique viewing angle (the second region) specifically refers to a region, like regions B and D, where the voltage-transmission intensity characteristic shows a lower transmission intensity than a frontal transmission intensity in FIG. 30.

In the present invention, narrow viewing angle properties, when compared with a case where the regions B, D in FIG. 3(*b*) are not switched to a light-blocking state, are achieved by switching the regions B, D to a light-blocking state. The regions B, D constitute the second regions, in which the frontal transmission intensity of the subpixel 41 varies less under an applied voltage.

Now, an optimal structure of the liquid crystal display panel 2 for the application of the present invention will be described. The liquid crystal display panel 2 explained here will simply exemplify an optimal liquid crystal display panel and is by no means intended to be limiting the invention.

The liquid crystal display panel 2 has such display properties that the transmission intensity at an oblique viewing angle is greater than the frontal transmission intensity, assuming that the frontal transmittance and the transmittance at an oblique viewing angle are both 1 when the panel 2 is producing a white display. The panel 2, as shown in FIG. 5, contains a liquid crystal cell 100 of vertical alignment mode and polarizers 101, 102 on respective sides of the liquid crystal cell 100 in normal direction.

The liquid crystal cell 100 contains an active matrix substrate ("thin film transistor substrate" or "TFT substrate") 100*a*, an opposite substrate (may be referred to as a "color filter substrate") 100b, and a liquid crystal layer 30 interposed between the TFT substrate 100a and the opposite substrate 100b.

The liquid crystal layer 30 is made up of a nematic liquid crystal material having negative dielectric anisotropy and an added chiral agent. The amount of the added chiral agent is specified so that the "d/p" of the liquid crystal layer 30 assumes, for example, values meeting the simulation conditions which will be detailed later, where d is the thickness of the liquid crystal layer 30 in meters, and p is the natural chiral pitch of the liquid crystal molecules 30a in meters. The d·Δn/λ of the liquid crystal layer 30 is also specified to assume, for example, values meeting the simulation conditions which will be detailed later, where d·Δn is the retardation caused by the liquid crystal layer 30, d is the thickness of the liquid crystal layer 30 in meters, Δn is the birefringence index of the liquid crystal molecules 30a, and λ is the wavelength of incident light in vacuum. The birefringence index (refractive index anisotropy) is given by Δn=ne−no, where ne is the refractive index of the liquid crystal molecules 30a along their long axes (extraordinary ray refractive index), and no is the refractive index of the liquid crystal molecules 30a along their short axes (ordinary ray refractive index).

Figure 5:
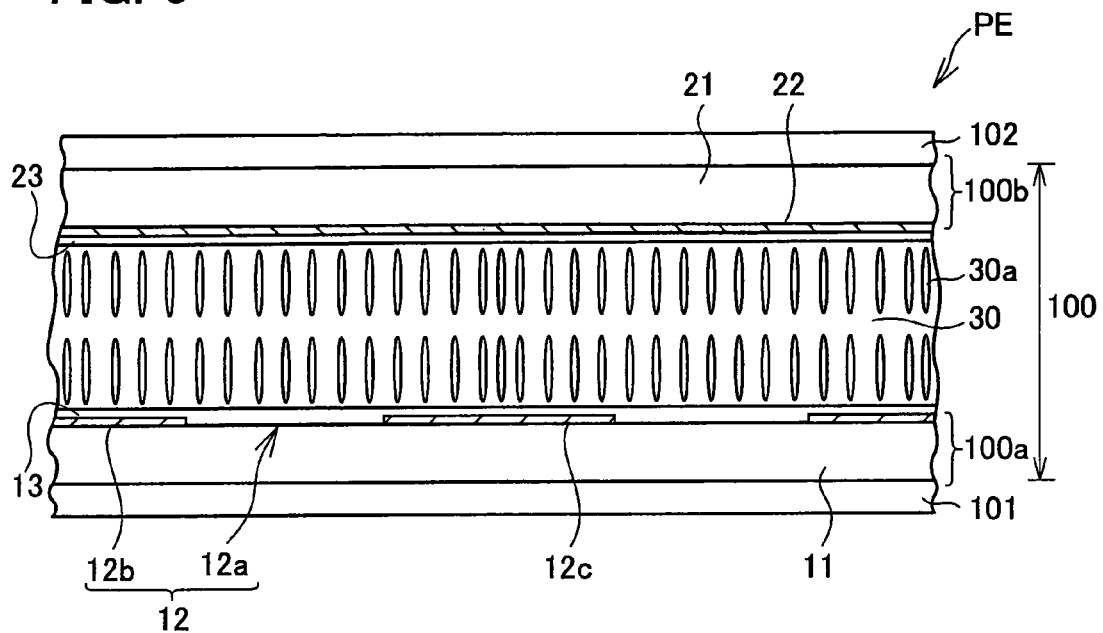
FIG. 5 is a schematic representation of the structure of a major part of the liquid crystal display device in cross-section in the absence of applied voltage.

The liquid crystal molecules 30a in the liquid crystal layer 30 align vertical to the surfaces of vertical alignment films 13, 23 in the absence of an applied voltage across the liquid crystal layer 30 as in FIG. 5. The alignment is caused by vertical alignment layers 13, 23 provided on the surfaces, of the TFT substrate 100a and the opposite substrate 100b, which face the liquid crystal layer 30. This state of the liquid crystal layer 30 is called the vertical alignment state.

The liquid crystal molecules 30a in the liquid crystal layer 30 in the vertical alignment state may lean somewhat off the normal to the surfaces of the vertical alignment films 13, 23 (surface of the substrate), depending on the types of the vertical alignment films 13, 23 and that of the liquid crystal material. Generally, however, if the liquid crystal molecules 30a align substantially vertical to the surfaces of the vertical alignment films 13, 23, that is, if the axes of the liquid crystal molecules 30a (i.e., axial orientation) align at an angle of about 85° to about 90°, it is called a vertical alignment state.

The TFT substrate 100a of the liquid crystal cell 100 contains a transparent substrate (for example, glass substrate) 11, the picture element electrodes 12 provided on its surface, and a vertical alignment film 13 provided on a surface, of the TFT substrate 100a, which faces the liquid crystal layer 30. In contrast, the opposite substrate 100b contains a transparent substrate (for example, glass substrate) 21, an opposite electrode (second electrode) 22 provided on its surface, and a vertical alignment film 23 provided on a surface, of the opposite substrate 100b, which faces the liquid crystal layer 30. The alignment of the liquid crystal layer 30 in each picture element region varies depending on the voltage applied to the picture element electrodes 12 and the opposite electrode 22 which are disposed opposite to each other across the liquid crystal layer 30. As the alignment of the liquid crystal layer 30 varies, the light transmitted by the liquid crystal layer 30 varies in polarization and intensity. These phenomena are exploited to produce displays.

In the following, a region, of a liquid crystal display device, which corresponds to a "picture element" which is a minimum display unit will be referred to as a "picture element region." In a color liquid crystal display device, a R, a G, and a B "picture element" constitute a "pixel." In an active matrix liquid crystal display device, picture element electrodes and an opposite electrode opposite the picture element electrodes determine picture element regions (hereinafter, "picture element regions PE"). In addition, in a simple matrix liquid crystal display device (will be detailed later), those regions where stripe-like column electrodes intersect row electrodes disposed at right angles to the column electrodes determine picture element regions PE. If there is provided a black matrix, strictly speaking, those regions to which voltage is applied in accordance with the state to be displayed and which correspond to the openings in the black matrix correspond to the picture element regions PE.

The following will describe, in detail as a preferred structure example of the liquid crystal cell 100: a region closed to an electric field formed by providing multiply divided electrodes (subpixels 41) in one picture element region PE on one of the substrates (101a); and an alignment control through an oblique electric field which occurs at its electrode edge.

Figure 6:
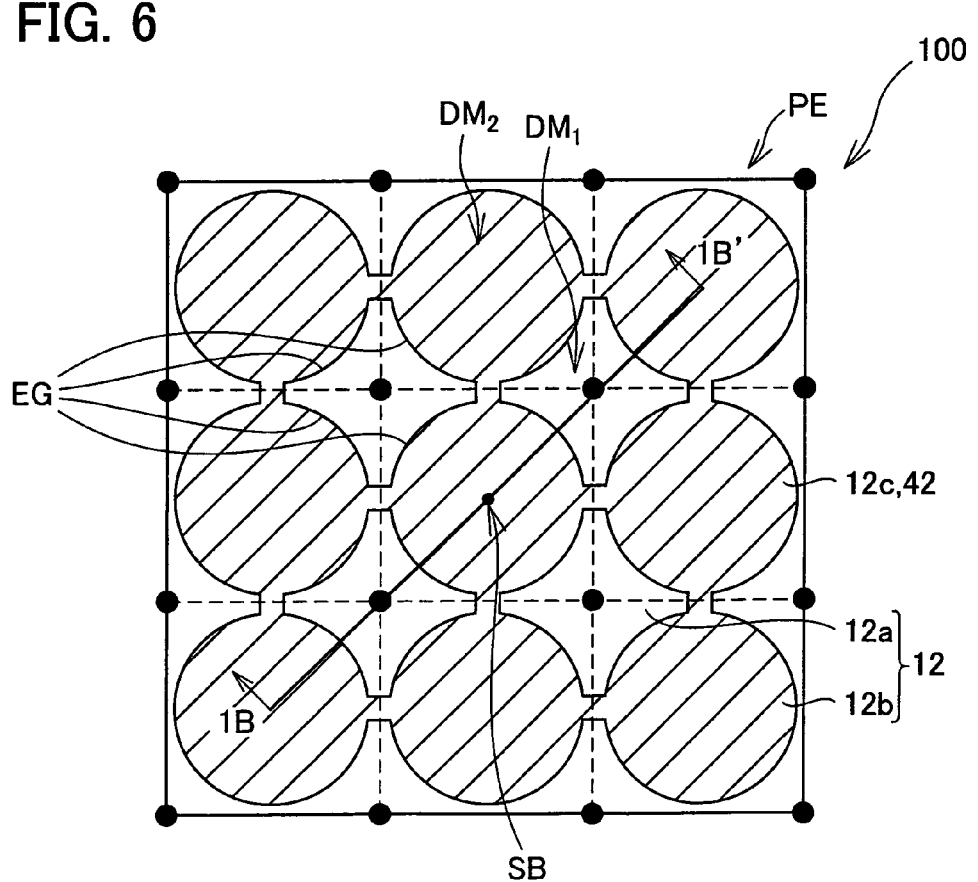
FIG. 6 is a top view of the structure of one picture element region when the liquid crystal display device is viewed normal to the substrate.

The picture element electrodes 12 are made of an electrically conductive film (for example, an ITO film). The picture element electrodes 12 are provided with multiple openings 12a as shown in FIG. 6 by, for example, removing the conductive film. FIG. 6 is a top view normal to the substrate. FIG. 5 is a cross-sectional view taken along line 1B-1B' in FIG. 6. In the following, those parts where there is a conductive film (those parts other than the openings 12a) will be referred to as solid parts 12b. A set of openings 12a are formed in each picture element electrode 12. The solid parts 12b are formed basically of a single continuous conductive film.

In the present embodiment, the multiple openings 12a are positioned so that their centers form a square lattice. A solid part, 12c, substantially surrounded by four openings 12a whose centers are positioned at four lattice points forming a unit cell ("unit solid part" or subpixel 41) is substantially circular. Each opening 12a is shaped substantially like a star, having four sides (edges) that resemble π/2 arcs, with a 4-fold axis at the center.

To ensure stable alignment across the picture element regions PE, it is preferable to form unit cells up to the edges of the picture element electrodes 12. To this end, it is preferable if the edges of the picture element electrode 12 are patterned to a shape which corresponds to about a half of the opening 12a (for those parts corresponding to sides) and about a quarter of the opening 12a (for those parts corresponding to corners) as shown in FIG. 6. In contrast, the openings 12a at the center of the picture element region PE have substantially the same shape and size. In contrast, the unit solid part 12c, in the unit cell formed by the openings 12a, is substantially circular and has substantially the same shape and size. Adjacent pairs of the unit solid parts 12c are connected to each other. These unit solid parts 12c form the solid parts 12b which function as a substantially single conductive film. The unit solid parts 12c may not be circular; it may be a square, rectangle, or a quadrilateral with corners being rounded, provided that the shape can give radial tilted alignment.

Applying voltage across the picture element electrodes 12 and opposite electrode 22 arranged as above generates an oblique electric field at the edge portions, EG, of the openings 12a (the peripheral sections inside the openings 12a and the border sections between the openings 12a and the solid parts 12b). The electric field forms multiple domains where the liquid crystal molecules 30a exhibit radial tilted alignment (hereinafter, "liquid crystal domains DM (DM$_1$ and DM$_2$ in FIG. 6)). One liquid crystal domain DM$_1$, DM$_2$ is provided in each of the regions corresponding to the openings 12a and the regions corresponding to the unit solid parts 12c.

In the liquid crystal cell 100 arranged as above, when the picture element electrodes 12 and the opposite electrode 22 have the same potential (in the absence of applied voltage across the liquid crystal layer 30), as shown in FIG. 5, the liquid crystal molecules 30*a* in the picture element region PE align vertical to the surfaces of the substrates (TFT substrate 100*a* and opposite substrate 100*b*).

Figure 7:
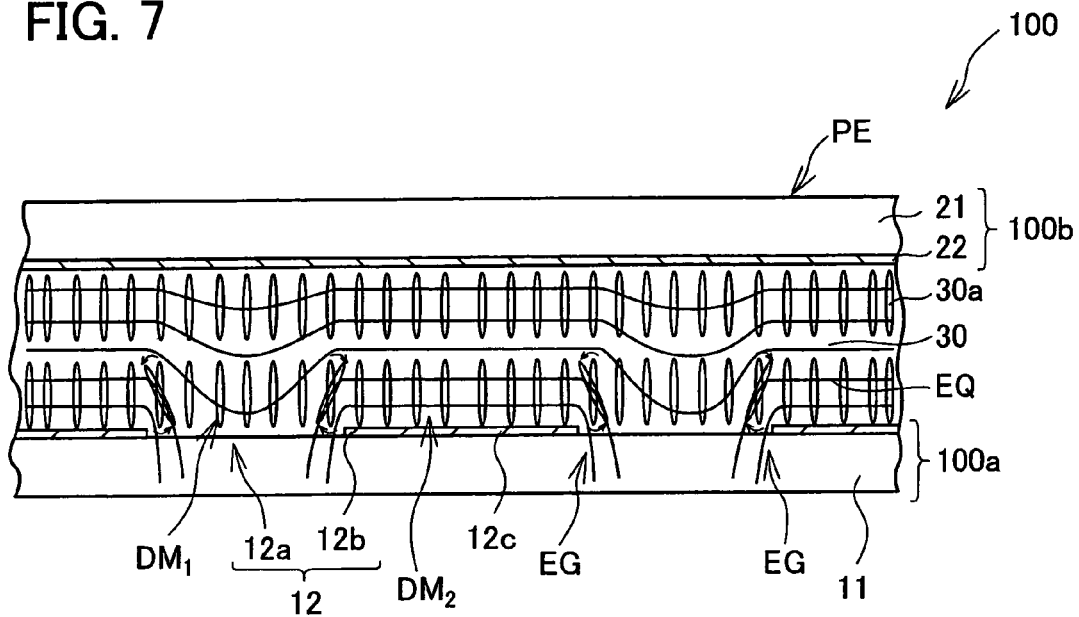
FIG. 7 is a schematic illustration of a liquid crystal cell in the liquid crystal display device. In the figure, the alignment of liquid crystal molecules in the liquid crystal layer is about to change (ON initial state) in response to the voltage applied across the liquid crystal layer.

In contrast, with voltage applied across the liquid crystal layer 30, as shown in FIG. 7, a potential gradient occurs in the liquid crystal layer 30. The gradient is represented by equal-potential lines EQ (perpendicular to electric lines of force). The equal-potential lines EQ are parallel to surfaces of the solid parts 12*b* and the opposite electrode 22 between the solid parts 12*b* of the picture element electrodes 12 and the opposite electrode 22 in the liquid crystal layer 30. Meanwhile, the equal-potential lines EQ shift toward the openings 12*a* in areas corresponding to the openings 12*a* in the picture element electrodes 12. Therefore, an oblique electric field, represented by oblique equal-potential lines EQ, occurs in areas on the edge portions, EG, of the openings 12*a* (the peripheral sections inside the openings 12*a* and the border sections between the openings 12*a* and the solid parts 12*b*) in the liquid crystal layer 30 as in the figure.

Figure 8:
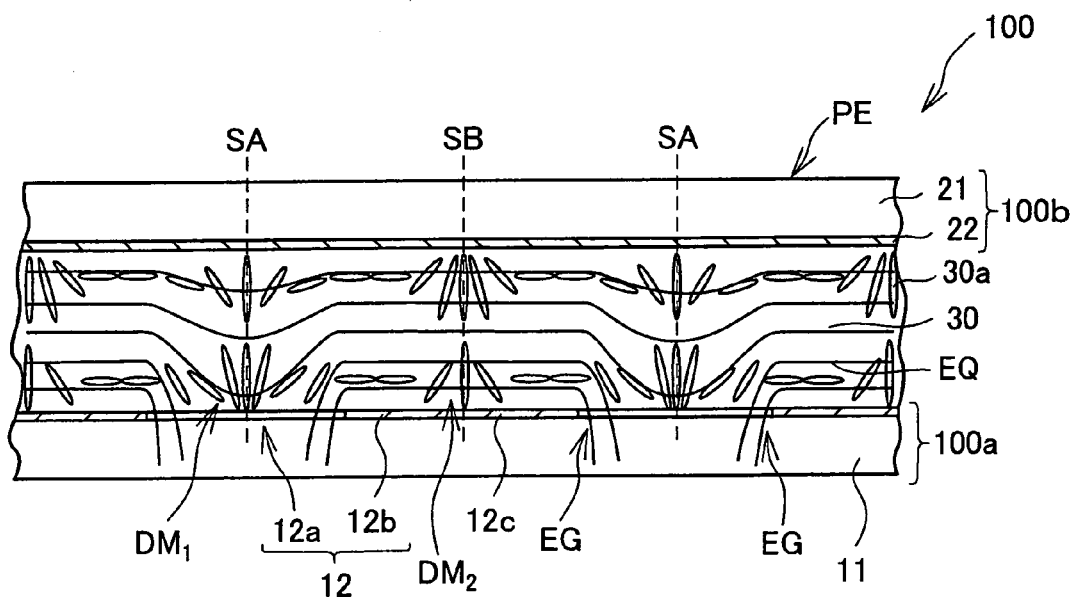
FIG. 8 is another schematic illustration of the liquid crystal cell in the liquid crystal display device. The figure shows the alignment of the liquid crystal molecules in a steady state after experiencing a change in response to the voltage applied across the liquid crystal layer.

Here, the liquid crystal molecules 30*a*, having negative dielectric anisotropy, experience a torque aligning the axial orientation of the liquid crystal molecules 30*a* parallel to the equal-potential lines EQ (perpendicular to the electric lines of force). Therefore, the liquid crystal molecules 30*a* on the edge portions EG tilt (rotate) clockwise in the edge portion EG in the right side in the figure and counterclockwise in the edge portion EG in the left side in the figure, as indicated by arrows in FIG. 7. This causes the liquid crystal molecules 30*a* in the liquid crystal layer 30, except for those at the center of the unit solid parts 12*c* and openings 12*a*, to align parallel to the equal-potential lines EQ as shown in FIG. 8. FIG. 7 schematically shows a state where the alignment of the liquid crystal molecules 30*a* has started to change in response to the voltage applied across the liquid crystal layer 30 (ON initial state). FIG. 8 schematically shows a state where the alignment of the liquid crystal molecules 30*a* which changed in accordance with the applied voltage has reached a steady state.

Figure 9:
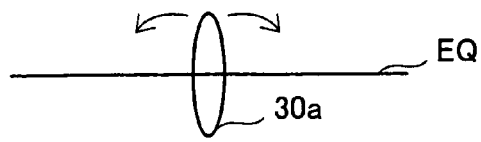
FIG. 9 is a schematic representation of the relationship between an equal-potential line and the alignment of a liquid crystal molecule. In the figure, the equal-potential line is at right angles to the axis of the liquid crystal molecule.

To explain into more detail, as shown in FIG. 9, upon the occurrence of an electric field represented by the equal-potential lines EQ perpendicular to the axial orientation of the liquid crystal molecules 30*a*, the liquid crystal molecules 30*a* experience a torque tilting the molecules 30*a* in either a clockwise or a counterclockwise direction at the same probabilities. Therefore, in the liquid crystal layer 30 between mutually opposing electrodes of a parallel-planar-type layout, some of the liquid crystal molecules 30*a* experience a clockwise torque, whereas the others experience a counterclockwise torque. This inconsistency could be a cause that hampers a smooth change to the alignment state in response to the voltage applied across the liquid crystal layer 30.

Figure 10:
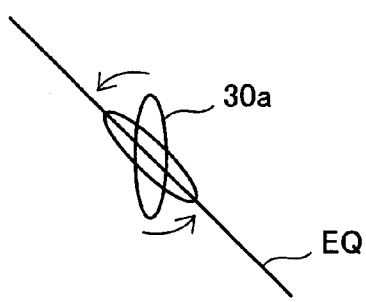
FIG. 10 is a schematic representation of the relationship between an equal-potential line and the alignment of a liquid crystal molecule. In the figure, the equal-potential line is at an angle to the axis of the liquid crystal molecule.

However, in the present embodiment, an oblique electric field forms in the areas on the edge portions EG. In this manner, if an electric field represented by the equal-potential lines EQ which tilt from the axial orientation of the liquid crystal molecules 30*a* (oblique electric field) occurs, as shown in FIG. 10, the liquid crystal molecules 30*a* tilt in a direction in which the molecules 30*a* would have to tilt least to be parallel to the equal-potential lines EQ (counterclockwise in the example in the figure).

Figure 11:
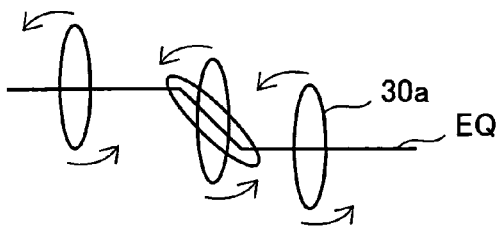
FIG. 11 is a schematic representation of the relationship between an equal-potential line and the alignment of liquid crystal molecules. The figure shows a liquid crystal molecule which aligns in an electric field where equal-potential lines are at an angle to the axis of the liquid crystal molecule. The other liquid crystal molecules are shown to align in an electric field where equal-potential lines are at right angles to the axes of the liquid crystal molecules, so as to match the liquid crystal molecules.
Figure 12:
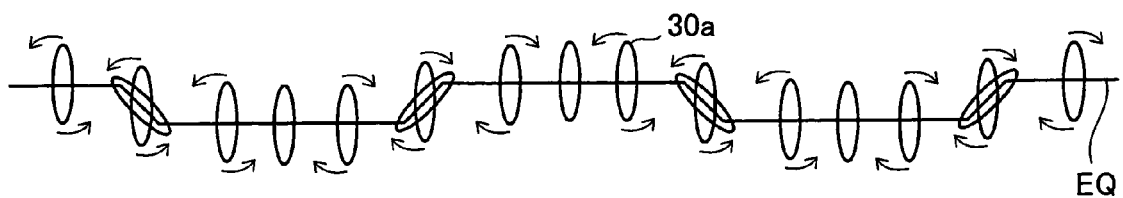
FIG. 12 is a schematic representation of the relationship between an equal-potential line and the alignment of liquid crystal molecules. An electric field is applied which forms a continuous, zigzag-like equal-potential line.

In contrast, those liquid crystal molecules 30*a* which exist in the area where an electric field represented by the equal-potential lines EQ perpendicular to the axial orientation of the liquid crystal molecules 30*a* occurs tilt in the same direction as those liquid crystal molecules 30*a* which are on the tilted equal-potential lines EQ so as to form continuous (matched) alignment with those liquid crystal molecules 30*a* on the tilted equal-potential lines EQ as shown in FIG. 11. Therefore, as shown in Figure 12, applying an electric field in which the equal-potential lines EQ take a continuous, zigzag-like shape causes the liquid crystal molecules 30*a* on the flat equal-potential lines EQ to align in the following alignment direction, in other words, so as to match with the alignment direction which is continuous with the equal-potential lines EQ and which is also restricted by those liquid crystal molecules 30*a* on the equal-potential lines EQ tilting from the liquid crystal molecules 30*a*. The term, "on the equal-potential lines EQ," refers to in an electric field represented by the equal-potential lines EQ. Therefore, the stabilization, of the alignment direction, which starts with the liquid crystal molecules 30*a* on the tilted equal-potential lines EQ progress toward the centers of the solid parts 12*b* and the centers of the openings 12*a*.

Here, those liquid crystal molecules 30*a* near the centers in the areas above the openings 12*a* are affected substantially equally by the alignment of those liquid crystal molecules 30*a* on the edge portions EG on both opposing sides of the openings 12*a*. Therefore, as shown in FIG. 8, the liquid crystal molecules 30*a* at the central portions of the openings 12*a* remains in a vertical alignment state with respect to the equal-potential lines EQ. In contrast, the liquid crystal molecules 30*a* in areas away from the centers of the openings 12*a* tilt as being affected by the alignment of the liquid crystal molecules 30*a* one the closer one of the edge portions EG respectively, so as to form a tilted alignment which is symmetrical with respect to the centers SA of the openings 12*a*.

Similarly, in those areas, above the unit solid parts 12*c*, which are substantially surrounded by the openings 12*a*, the liquid crystal molecules 30*a* in the areas corresponding to the unit solid parts 12*c* are affected by the alignment of the liquid crystal molecules 30*a* on the edge portions EG of the openings 12*a*. In addition, the liquid crystal molecules 30*a* near the centers of the unit solid parts 12*c* are affected substantially equally by the alignment of those liquid crystal molecules 30*a* on the edge portions EG on both opposing sides of the unit solid parts 12*c*. Consequently, in the areas above the unit solid parts 12*c*, the liquid crystal molecules 30*a* are also in a tilted alignment state which is symmetrical with respect to the centers SB (corresponding to the centers of the unit cells where the openings 12*a* are formed) of the unit solid parts 12*c*.

Therefore, as mentioned earlier, the alignment due to the progress of the change in alignment which starts with the liquid crystal molecules 30*a* on the tilted equal-potential lines EQ and which causes the liquid crystal molecules 30*a* in the picture element region PE to reach a steady state, the state of the liquid crystal layer 30 in cross-section matches the alignment state schematically shown in FIG. 8.

Figure 13:
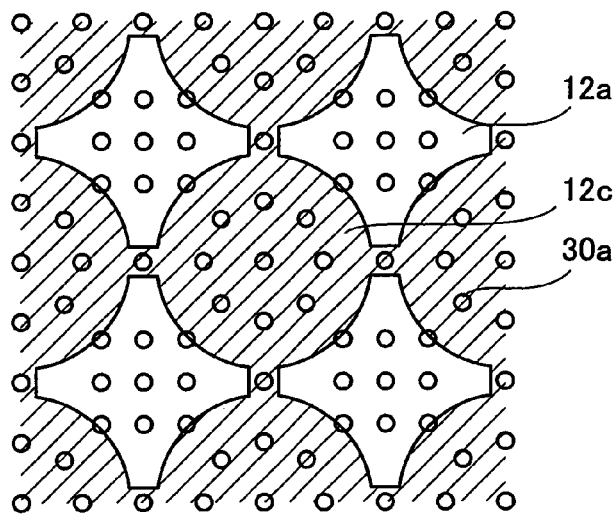
FIG. 13 is a schematic representation of the alignment direction of liquid crystal molecules, as viewed normal to the substrate in the absence of applied voltage.
Figure 14:
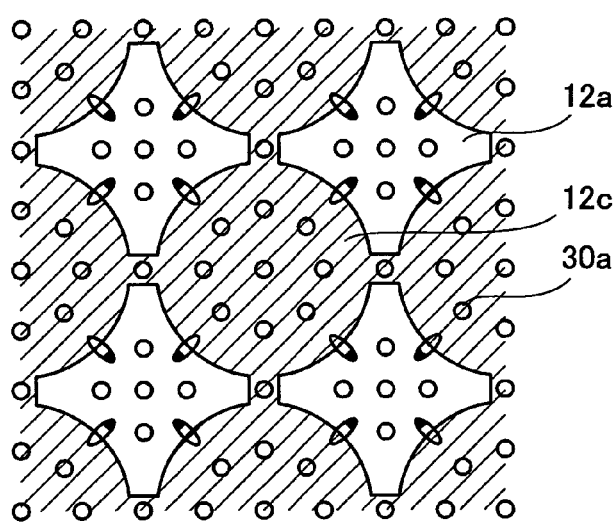
FIG. 14 is a schematic representation of the alignment direction of liquid crystal molecules, as viewed normal to the substrate in an ON initial state.
Figure 15:
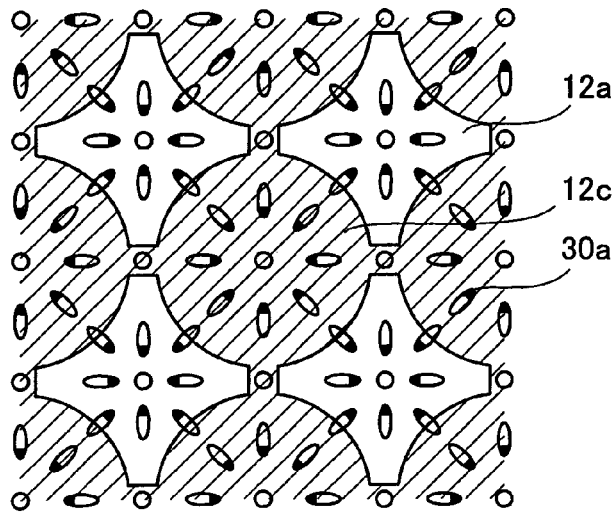
FIG. 15 is a schematic representation of the alignment direction of liquid crystal molecules, as viewed normal to the substrate in a steady state.

In contrast, the alignment state of the liquid crystal molecules 30*a* in the liquid crystal layer 30 as viewed normal to the substrate, in other words, the alignment state of the liquid crystal molecules 30*a* in the liquid crystal layer 30 in the in-plane direction of the substrate, changes depending on voltage application as shown in FIG. 13 to FIG. 15. In other words, in the absence of applied voltage across the liquid crystal layer 30, as shown in FIG. 13, the liquid crystal molecules 30*a* in the picture element region PE are restricted in terms of alignment direction by the vertical alignment layers 13, 23 and stays in a vertical alignment state. Incidentally, in the figures showing the alignment state of the liquid crystal molecules 30*a* as viewed normal to the substrate (especially, FIG. 14 and FIG. 15), the black tips of the liquid crystal molecules 30*a* shown by ellipses indicate that the liquid crystal molecules 30a are tilted in such a manner that the tips are closer to the substrate side where the picture element electrodes 12 with the openings 12a are provided than the other tips.

As an electric field is applied across the liquid crystal layer 30 to generate an electric field represented by the equal-potential lines EQ in FIG. 7, the liquid crystal molecules 30a with negative dielectric anisotropy experience a torque that renders the axial orientation parallel to the equal-potential lines EQ. As mentioned earlier, the liquid crystal molecules 30a in the electric field represented by the equal-potential lines EQ perpendicular to the molecular axes of the liquid crystal molecules 30a do not have a definite tilting (rotating) direction, and therefore do not readily undergo alignment changes (tilting or rotation). In contrast, the liquid crystal molecules 30a under the equal-potential lines EQ tilted from the molecular axes of the liquid crystal molecules 30a have a definite tilting (rotation) direction, and therefore readily undergo alignment changes. Therefore, as shown in FIG. 14, the axial orientation of the liquid crystal molecules 30a becomes stable in areas where the molecular axes of the liquid crystal molecules 30a are tilted from the equal-potential lines EQ, in other words, a state shown in FIG. 15 where the liquid crystal molecules 30a start tilting from the edge portions EG of the openings 12a, and the surrounding liquid crystal molecules 30a tilt to match the alignment of the tilted liquid crystal molecules 30a on the edge portions EG of the openings 12a. Incidentally, in the present embodiment, the liquid crystal molecules 30a have a natural chiral pitch p, showing a chiral structure. The effects of the chirality will be detailed later.

Here, the openings 12a of the present embodiment have a rotationally symmetric shape. Therefore, under an applied voltage, the liquid crystal molecules 30a in the picture element region PE tilt from the edge portions EG of the openings 12a toward the centers of the openings 12a. In addition, under an applied voltage, alignment limiting forces for the liquid crystal molecules 30a from the edge portions EG strike a balance near the centers SA of the openings 12a. Therefore, the liquid crystal molecules 30a near the centers SA of the openings 12a remain in a state aligned vertical to the substrate surface, and the surrounding liquid crystal molecules 30a are in a state aligned radially tilted around the liquid crystal molecules 30a near the centers SA of the openings 12a. In addition, in this state, the alignment state of the surrounding liquid crystal molecules 30a changes continuously (smoothly) from one molecule to the other.

As a result of this, when viewed perpendicular to the display surface of the liquid crystal cell 100 (perpendicular to the surfaces of the substrates 100a, 100b), the axial orientation of the liquid crystal molecules 30a is in a state of aligning radial from the centers of the openings 12a. Incidentally, in this specification, a state where the liquid crystal molecules 30a in the liquid crystal layer 30 align tilted and radially in this manner is termed the "radial tilted alignment." In addition, an area of the liquid crystal layer 30 where the liquid crystal molecules 30a align tilted and radially from one center (for example, the area of the liquid crystal layer 30 where the liquid crystal molecules 30a undergoes radial tilted alignment around the center point of the openings 12a as discussed earlier) is termed the liquid crystal domain DM as discussed earlier. Incidentally, in the present embodiment, especially, a liquid crystal domain DM formed in the areas corresponding to the openings 12a is denoted a liquid crystal domain $DM_1$ as discussed earlier.

Similarly, the liquid crystal molecules 30a undergoes radial tilted alignment also in the areas corresponding to the unit solid parts 12c, thereby forming a liquid crystal domain DM where the liquid crystal molecules 30a undergoes radial tilted alignment also in the areas (Incidentally, in the present embodiment, especially, the unit solid part 12c, that is, a liquid crystal domain DM formed in the solid part 12b, is denoted a liquid crystal domain $DM_2$ as discussed earlier). To describe it in more detail, the liquid crystal molecules 30a tilt so as to match the alignment of the liquid crystal molecules 30a tilted by the oblique electric field generated by the edge portions EG of the openings 12a. Under an applied voltage, the alignment limiting force for the liquid crystal molecules 30a from the edge portions EG strike a balance near the centers SB of the unit solid parts 12c. Therefore, under an applied voltage, the liquid crystal molecules 30a near the centers SA of the openings 12a remain in a state aligned vertical to the substrate surface, and the surrounding liquid crystal molecules 30a are in a state where the in-plane component of the alignment direction is radial around the liquid crystal molecules 30a near the centers SB of the unit solid parts 12c, and the normal component is tilted. In addition, in this state, the alignment state of the surrounding liquid crystal molecules 30a changes continuously (smoothly) from one molecule to the other.

In this manner, the picture element electrodes 12 of the liquid crystal display device 1 in accordance with the present embodiment has multiple openings 12a. Applying voltage to the picture element electrodes 12 creates an electric field represented by the equal-potential lines EQ which has areas where the lines tilt in the liquid crystal layer 30 in the picture element region PE. The liquid crystal molecules 30a having negative dielectric anisotropy in the liquid crystal layer 30 is in a vertical alignment state in the absence of applied voltage. Upon application of voltage to the picture element electrodes 12, a change in the alignment of the liquid crystal molecules 30a on the tilted equal-potential lines EQ triggers a change in the alignment direction of those molecules 30a. Thereby, the liquid crystal domain DM having stable radial tilted alignment is formed in the openings 12a and the solid parts 12b. Here, the alignment of the liquid crystal molecules 30a in the liquid crystal domain DM changes in accordance with the voltage applied across the liquid crystal layer 30. As a result, the liquid crystal display device 1 can alter display state in accordance with the applied voltage.

In addition, the radial tilted alignment of the liquid crystal molecules 30a in the liquid crystal domain $DM_2$ formed in the unit solid parts 12c and the radial tilted alignment of the liquid crystal molecules 30a in the liquid crystal domain $DM_1$ formed in the openings 12a are continuous, and both match the alignment of the liquid crystal molecules 30a on the edge portions EG of the openings 12a. Therefore, the liquid crystal molecules 30a in the liquid crystal domain $DM_1$ formed in the openings 12a align like a corn with an open top (on the side of the substrate 100b), and the liquid crystal molecules 30a in the liquid crystal domain $DM_2$ formed in the unit solid parts 12c align like a corn with an open bottom (on the side of the substrate 100a). In this manner, the radial tilted alignment in the liquid crystal domain $DM_1$ formed in the openings 12a and the liquid crystal domain $DM_2$ formed in the unit solid parts 12c are continuous with each other. Therefore, no disclination lines (defective alignments) occur at the border between them. Display quality does not fall due to the occurrence of disclination lines.

Incidentally, as in the present embodiment, if the liquid crystal domains DM where the liquid crystal molecules 30a exhibit radial tilted alignment are arranged in a square lattice across the picture element region PE, the probabilities of existence of the liquid crystal molecules 30a having respective axial orientations has rotational symmetry. High quality displays with no granular appearance can be realized for all viewing directions. Here, to reduce the viewing angle dependence of the liquid crystal domain DM exhibiting radial tilted alignment, the liquid crystal domain DM preferably shows high rotational symmetry (a 2- or more fold axis, or more preferably 4- or more fold axis). In addition, to reduce the viewing angle dependence across the picture element region PE, the multiple liquid crystal domains formed in the picture element region PE preferably has an arrangement (for example, square lattice) represented by a combination of units (for example, unit cells) showing high rotational symmetry (a 2- or more fold axis, or more preferably 4- or more fold axis).

In the liquid crystal display device 1 using the liquid crystal cell 100, nearly all the liquid crystal molecules 30a in the liquid crystal layer 30 are in a vertical alignment state in the absence of applied voltage (electric field). Therefore, as shown in FIG. 5, as the liquid crystal cell 100 is flanked between the polarizer 101 and the polarizer 102, incident light is rendered linearly polarized by the polarizer 101 before entering the liquid crystal cell 100. In the liquid crystal cell 100, no birefringence effect occurs. The incident light passes through the liquid crystal cell 100 without substantially changing state before reaching the polarizer 102. Here, the polarization axis of the polarizer 101 and that of the polarizer 102 are orthogonal to each other. Therefore, most of the light having passed through the liquid crystal cell 100 is absorbed by the polarizer 102. As a result of this, the liquid crystal display device 1 produce a black display in the absence of applied voltage. Especially, in the liquid crystal display device 1 of the present embodiment, the liquid crystal molecules 30a in the liquid crystal cell 100 can achieve a substantially completely vertical alignment state in a black display; therefore little light leaks, and a high contrast display can be realized.

In contrast, in the presence of applied voltage, the liquid crystal molecules 30a in the liquid crystal layer 30 are in a radial tilted alignment state; therefore, as the liquid crystal cell 100 is flanked between the polarizer 101 and the polarizer 102, incident light is rendered linearly polarized by the polarizer 101. As the light enters the liquid crystal cell 100, since birefringence effect occurs in the liquid crystal cell 100, the incident light passes through the liquid crystal cell 100 while changing polarization, before reaching the polarizer 102 side. Under these circumstances, a component of light having changed polarization to the polarization axis direction of the polarizer 102 passes through and leaves the polarizer 102, thereby achieving a white display. In addition, by changing the applied voltage, the tilting amount of the radial tilted alignment changes, and so does the amount of occurrence of birefringence effect caused by that. Therefore, the amount of light leaving the polarizer 102 changes. This makes it possible to produce a grayscale level display in accordance with the applied voltage.

In addition, since the molecules are alignment radially tilted, the probabilities of existence of the liquid crystal molecules 30a aligned in orientations in the picture element region PE has rotational symmetry, areas where the alignment directions of the liquid crystal molecules 30a are different from each other optically compensate for each other. As a result of these, from whichever direction the liquid crystal display device 1 may be viewed by the user of the liquid crystal display device 1, the intensity of outgoing light (brightness of the picture element) is substantially equal if considered across the whole picture element region PE, thereby achieving a wide viewing angle.

Figure 16:
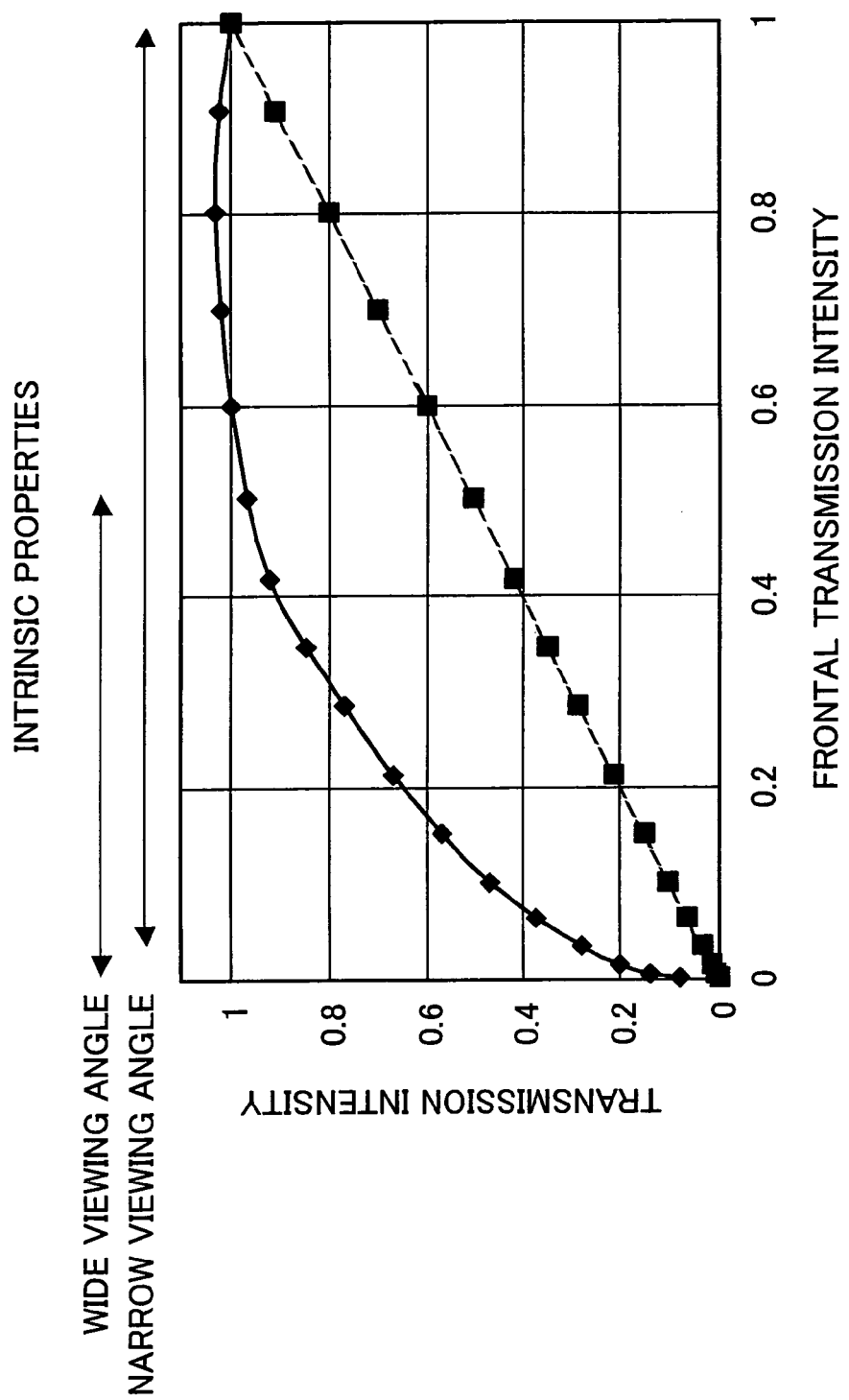
FIG. 16 is a graphical representation of an intrinsic property of a liquid crystal display panel (will be detailed in the present embodiment).

Here, FIG. 16 is a graphical representation of a display property (intrinsic property) with no viewing angle control with respect to the liquid crystal display panel 2. The intrinsic property shows display properties such that transmission intensities at oblique viewing angles are greater than the frontal transmission intensity in an initial state where no viewing angle control is being carried out with respect to the liquid crystal display panel 2.

That is, assuming that both the frontal transmittance and the transmittance at an oblique viewing angle be 1 in a white display, the liquid crystal display panel 2 has display properties such that transmission intensities at oblique viewing angles are greater than the frontal transmission intensity.

FIG. 16 shows display properties such that an excess brightness phenomenon occurs at oblique viewing angles at low grayscale levels (near a black display) and the grayscale level reverses at oblique viewing angles at high grayscale levels (near a white display).

In the liquid crystal display panel 2 thus arranged, as shown in FIG. 15, the liquid crystal domain DM where the liquid crystal molecules 30a are in a radial tilted alignment is formed across the picture element regions PE. In this case, even when a subpixel 41 is rectangular as in FIG. 17(a) or a square as in FIG. 17(b), there are no problems if the liquid crystal molecules 30a are in a tilted alignment state as shown in FIG. 17(c).

In addition, other than the aforementioned radial tilted alignment, the alignment state of the liquid crystal molecules 30a may be a four-segment alignment as in FIG. 18(a) and FIG. 18(b) where one subpixel 41 is divided into four domains in which the liquid crystal molecules 30a align in a different direction from those in the domain DM adjacent in an in-plane direction of the substrate (the four liquid crystal domains DM are denoted DM1 to DM4 in FIGS. 18(a), 18(b)). In this case, it would be sufficient again if the liquid crystal molecules 30a are in a tilted alignment state as shown in FIG. 18(c). That is, for example, in the liquid crystal display panel 2, in one subpixel, the liquid crystal molecules 30a may align tilted and radially in four directions from the center point of one subpixel 41.

In other words, the liquid crystal molecules 30a in the liquid crystal display panel 2 may be controlled in terms of alignment to achieve four domain directions, that is, there are four alignment directions for the liquid crystal molecules 30a in each liquid crystal domain DM. Due to this, since there exist clear borders dividing domains, defective alignments are likely to occur at those parts; nevertheless, those areas which must be shielded from light in a narrow viewing angle mode are domain-divided. Therefore, the borders are clear and easy to design.

Further, other than the aforementioned radial tilted alignment, the alignment state of the liquid crystal molecules 30a may be a two-segment alignment as in FIGS. 19(a), 19(b). In this case, it would be sufficient again if the liquid crystal molecules 30a are in a tilted alignment state as shown in FIG. 19(c).

Here, in cases where the subpixels 41 are an electrode region forming a one radial tilted alignment state or a pair of four-domain state, the arrangements in FIG. 20(a) to FIG. 20(f) give possible examples of one-column subpixels where one or multiple subpixels 41 are provided in one column (one straight line).

For example, FIG. 20(a) to FIG. 20(e) show examples where two or more subpixels 41 are provided in one column; FIG. 20(f) shows an example where the one-column subpixel is constituted by one rectangular subpixel 41.

A suitable subpixel is selected from these various subpixels 41 in accordance with the usage of the liquid crystal display device 1.

Now, the panel, 3, for use in viewing angle property control will be described which controls the viewing angle properties of the liquid crystal display panel 2.

Figure 21:
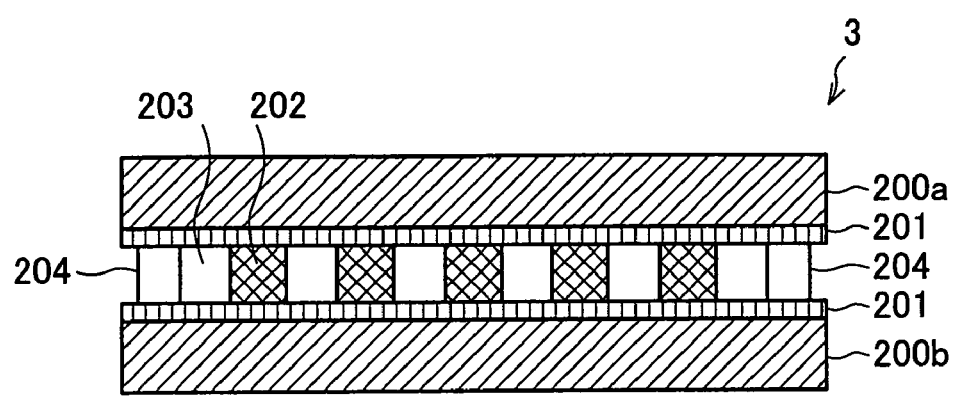
FIG. 21 is a schematic cross-sectional view of the panel for use in viewing angle property control shown in FIG. 1(a) and FIG. 1(b).

The panel, 3, for use in viewing angle property control, as shown in FIG. 21, contains a pair of transparent substrates (e.g., glass substrates) 200a, 200b and transparent conductive films (ITO) 201 formed on the opposing surfaces of the substrates 200a, 200b. Between the transparent substrates 200a, 200b, there are provided multiple rib sections 202, arranged in a matrix, which function as an organic insulating layer. The rib sections 202 are made of an acrylic organic resin. Besides, between the rib sections 202, a dispersion agent 203 is injected. Incidentally, around the transparent substrates 200a, 200b is there provided a seal member 204 sealing the dispersion agent 203.

Incidentally, the rib sections 202 are always in a white state, in other words, in a light-transmitting state.

Figure 22:
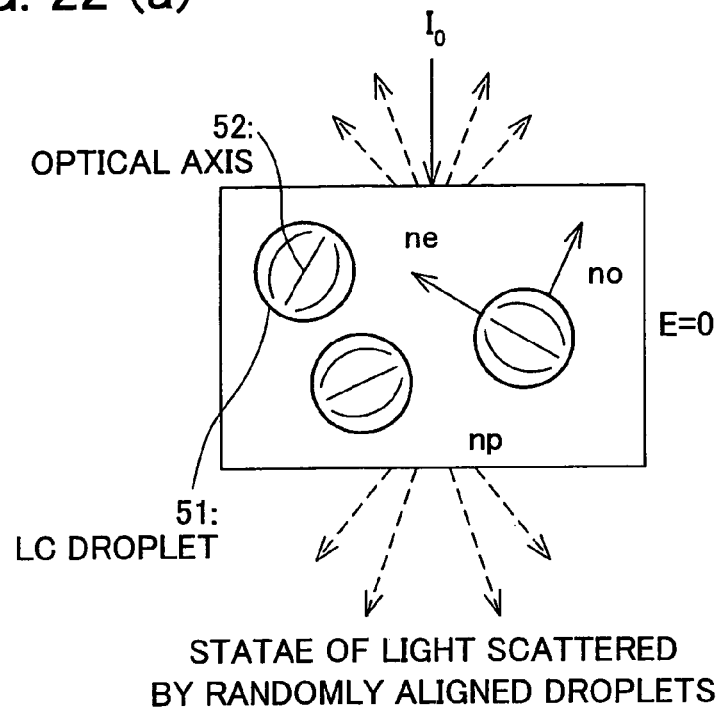
FIG. 22(a) is a drawing illustrating the behavior, in a light-scattering state, of polymer-dispersed liquid crystal injected into the panel for use in viewing angle property control shown in FIG. 21.
FIG. 22(b) is a drawing illustrating the behavior, in a light-transmitting state, of polymer-dispersed liquid crystal injected into the panel for use in viewing angle property control shown in FIG. 21.
Figure 22:
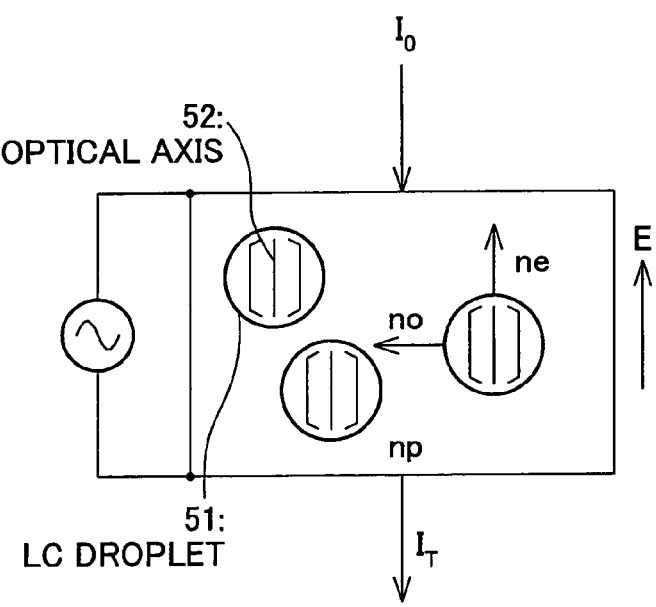

In addition, the dispersion agent 203 is a polymer-dispersed agent composed of a polymer-dispersed liquid crystal. The agent 203 is a polymer-dispersed agent in which, as shown in FIG. 22(a) and FIG. 22(b), the arrangement of liquid crystal molecules in spherical droplets of the polymer-dispersed liquid crystal, for example, a polymer-dispersed nematic liquid crystal, is changed in an electric field, and accompanying changes in the refractive index are applied. Here, in the figure, Io is incident light, IT is transmitted light, no is an ordinary ray refractive index, ne is an extraordinary ray refractive index, and np is the refractive index of a polymer.

In other words, in the polymer-dispersed agent, the optical axes 52 of the liquid crystal droplets 51 align irregularly as shown in FIG. 22(a) in an OFF state (electric field E=0) where no electric field E is applied. The extraordinary ray refractive index ne does not match the refractive index np of the polymer. The agent scatters light and appears opaque white.

In addition, in the polymer-dispersed agent, the optical axes of the liquid crystal droplets 51 are arranged in an electric field direction as shown in FIG. 22(b) in an ON state where an electric field E is applied. The ordinary ray refractive index no matches the refractive index np of the polymer. The agent scatters less light and appears transparent.

Utilizing these properties of the polymer-dispersed agent, the panel, 3, for use in viewing angle property control controls switching between scattering and transmission in areas where the dispersion agent 203 is injected (light-blocking layer, for example, those areas which exhibit a light-blocking state in the absence of applied electric field and a light-transmitting state in the presence of applied electric field). In this case, as shown in FIG. 21, the transparent conductive films 201, 201 which are formed to sandwich the dispersion agent 203 apply an electric field to the dispersion agent 203.

Therefore, in the panel, 3, for use in viewing angle property control thus arranged, the presence/absence of electric field applied to the dispersion agent 203 switches the areas where the dispersion agent 203 is injected between light scattering/light transmission. In this panel, 3, for use in viewing angle property control, the rib sections 202 are transparent; therefore, if the areas where the dispersion agent 203 is injected are in a light-transmitting state, the entire panel, 3, for use in viewing angle property control is in a light-transmitting state. If the areas where the dispersion agent 203 is injected are in a light-scattering state, only particular parts (the areas where the dispersion agent 203 is injected) of the panel, 3, for use in viewing angle property control are in a light-scattering state (light-blocking state).

In this manner, according to the liquid crystal display device 1 in accordance with the present embodiment, by arranging all or some of the areas where the dispersion agent 203 is injected, in other words, the second regions where no excess brightness occurs for oblique viewing angles, so as to be in a light-blocking state when viewed from oblique directions, the panel, 3, for use in viewing angle property control can increase that area in the picture element region PE in which excess brightness occurs at oblique viewing angles. In this manner, if the area in the picture element region PE where excess brightness occurs at oblique viewing angles, the display content on the liquid crystal display panel 2 becomes hard to visually recognize in oblique directions. That is, the viewing angle properties of the liquid crystal display panel 2 can be narrowed, in other words, the liquid crystal display panel 2 can be made to exhibit narrow viewing angle properties.

In addition, if all or some of the second regions are arranged so by means of the panel, 3, for use in viewing angle property control so that the regions are in a light-transmitting state, excess brightness at oblique viewing angles is reduced. Therefore, the viewing angle properties of the liquid crystal display panel 2 are widened compared with the case where all or some of the second regions are arranged so that the regions are in a light-blocking state.

Therefore, in the picture element region PE where there coexist the first regions where excess brightness occurs at oblique viewing angles and the second region where no excess brightness occurs at oblique viewing angles, the liquid crystal display panel 2 can be rendered to have narrow viewing angle properties or wide viewing angle properties by arranging at least some of the second regions where no excess brightness occurs at oblique viewing angles so that those regions are in either a light-blocking state or a light-transmitting state.

That is, according to the liquid crystal display device 1, due to the provision of the panel, 3, for use in viewing angle property control, the liquid crystal display panel 2 can be rendered to have narrow viewing angle properties or wide viewing angle properties by varying the ratio of the first regions where excess brightness occurs at oblique viewing angles and the second regions where no excess brightness occurs at oblique viewing angles in the one or multiple picture element regions PE constituting pixels in the liquid crystal display panel 2 in accordance with, for example, the viewing angle property switching signal.

Figure 23:
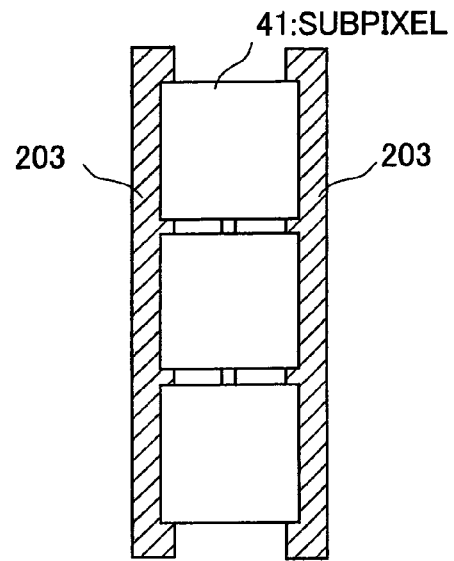
FIG. 23 is a drawing illustrating an example of the relative positions of the subpixels in a liquid crystal display panel and a dispersion agent in a panel for use in viewing angle property control.

Incidentally, those areas of the panel, 3, for use in viewing angle property control in which the dispersion agent 203 is injected only need be formed at positions corresponding to bus lines 15 (see FIG. 1(a)) driving the pixels in the liquid crystal display panel 2. For example, when each pixel is composed of a one-column subpixel in which one or multiple subpixels 41 are provided in one column, as shown in FIG. 23, the areas where the dispersion agent 203 is injected are rendered to correspond on those bus lines 15 (not shown; see FIG. 1(a)) on the sides of the pixel. When each pixel is composed of multiple-column subpixels in which multiple subpixels 41 are provided in multiple columns (here, assume two-column subpixels), as shown in FIG. 24, similarly to the case with the one-column subpixel, the areas where the dispersion agent 203 is injected are only need to be rendered to correspond to positions corresponding to the bus lines 15 on the sides of the pixel (not shown; see FIG. 1(a)) and to positions corresponding to the intervals between the columns of subpixels 41 in the pixel.

As in the foregoing, the bus lines 15 are formed on the sides of each pixel in the liquid crystal display panel 2. Therefore, in the case of one-column subpixels, as shown in FIG. 23, it becomes possible to have the areas of the panel, 3, for use in viewing angle property control where the dispersion agent 203 is injected overlap the bus lines.

Figure 24:
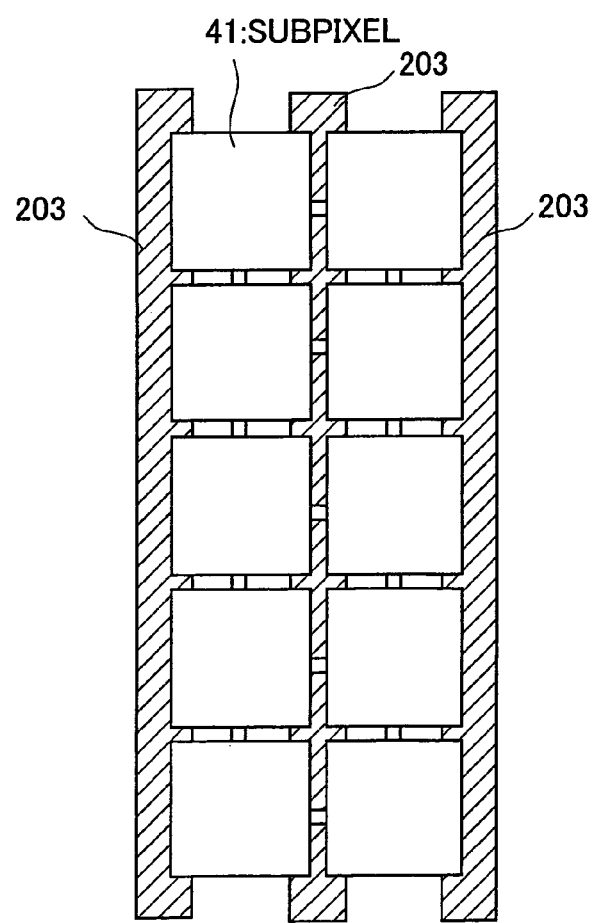
FIG. 24 is a drawing illustrating another example of the relative positions of the subpixels in a liquid crystal display panel and a dispersion agent in a panel for use in viewing angle property control.

In contrast, in the case of each pixel being constituted by multiple- (two- or more-) column subpixels 41, as shown in FIG. 24, the areas of the panel, 3, for use in viewing angle property control where the dispersion agent 203 is injected need be provided in the pixels (rendered to correspond). In such a case, to ensure transmittance, a dispersion agent 203 needs be used which can render light transmission/light blocking ON/OFF in oblique directions and in so doing, retain almost the same transmittance in the front face direction.

Figure 25:
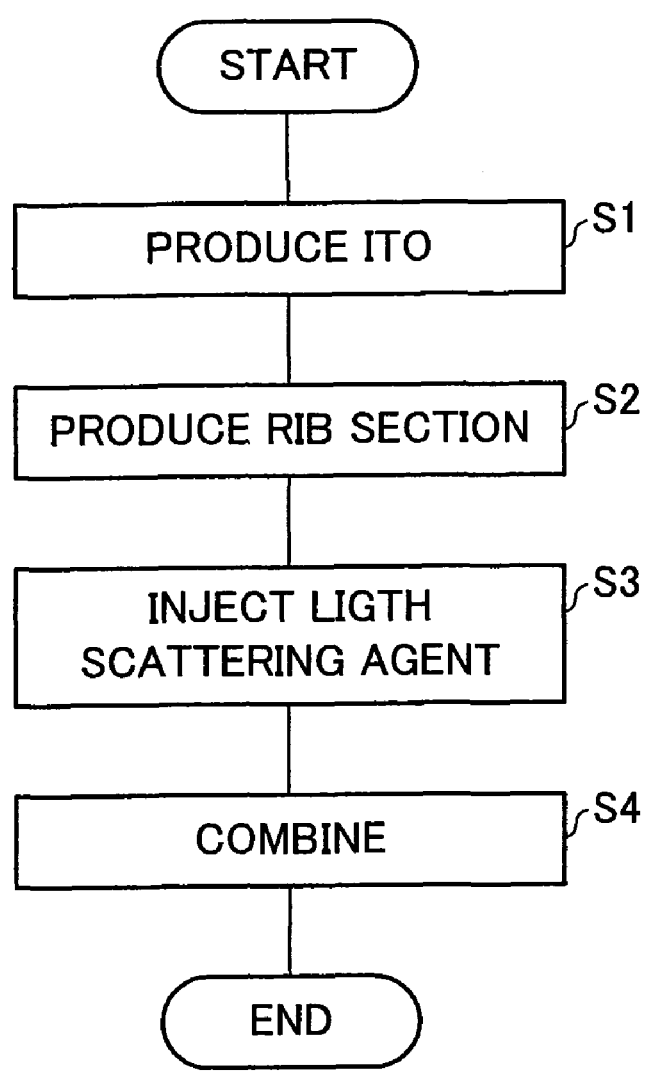
FIG. 25 is a flow chart illustrating a manufacturing method for the panel for use in viewing angle property control.
Figure 26:
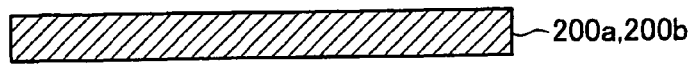
FIG. 26(a) to FIG. 26(d) are drawings illustrating manufacturing steps for a panel for use in viewing angle property control according to the flow chart shown in FIG. 25.
Figure 26:
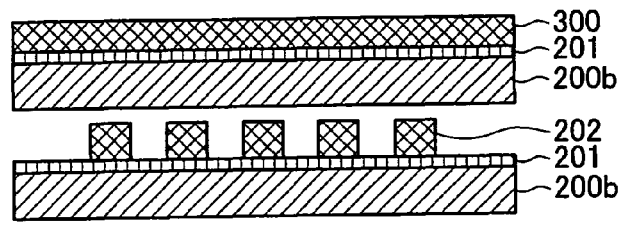
Figure 26:
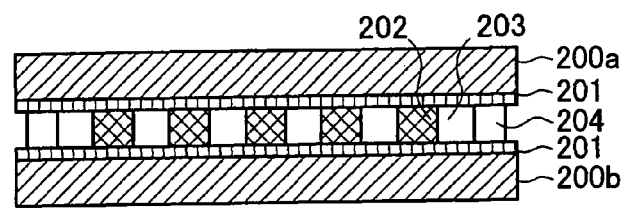
Figure 26:
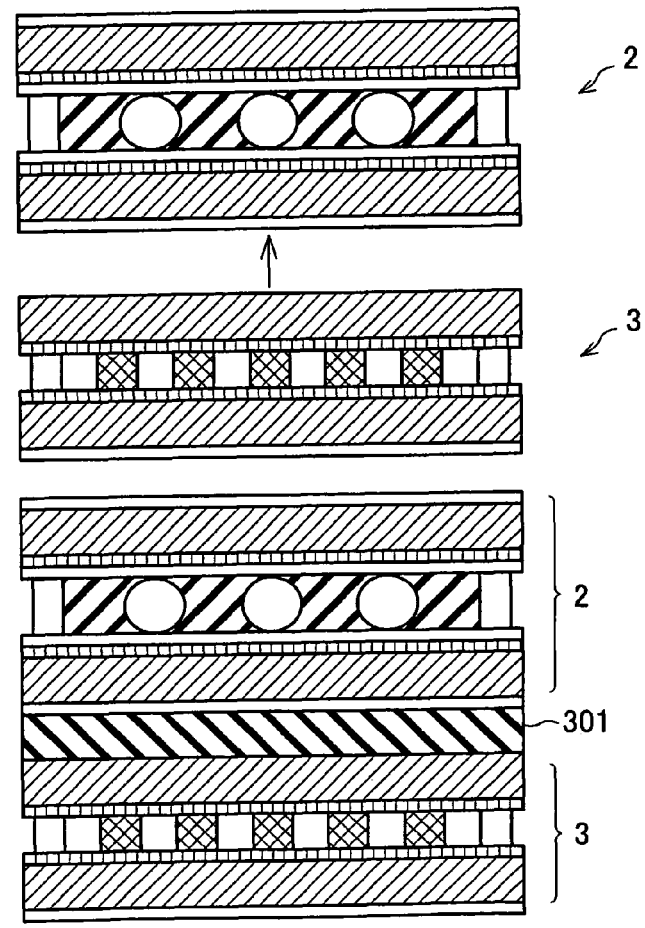

Next, a method of manufacturing the liquid crystal display device 1 in accordance with the present embodiment will be described in reference to a flow chart in FIG. 25 and step diagrams in FIG. 26.

First, the transparent conductive film (ITO) 201 is formed on the transparent substrates 200a, 200b (step S1). Here, as shown in FIG. 26(a), the transparent substrates 200a, 200b made of raw glass are washed using a washer device. The transparent conductive film 201 is then formed on the transparent substrates 200a, 200b using a sputter device.

Next, the rib sections 202 are formed on the ITO formed on the transparent substrate 200b (step S2). Here, as shown in FIG. 26(b), an organic insulating layer 300 of an acrylic organic material is applied on the transparent conductive film 201 on the transparent substrate 200b and exposed to light using an exposure device and a mask of a desired pattern. The layer is then developed by a developer device to form the multiple rib sections 202.

Subsequently, the dispersion agent 203, which will act as a light diffuse agent, is injected between the formed rib sections 202 (step S3). Here, as shown in FIG. 26(c), the transparent substrate 200a prepared in step S1 is combined with the transparent substrate 200b on which are formed the rib sections 202. Under these circumstances, to seal or prevent the dispersion agent 203 injected in the intervals between the rib sections 202 from leaking out, the seal member 204 is formed along the outer rim of the combined 200a, 200b.

Finally, the liquid crystal display panel 2 prepared in advance is combined to the panel, 3, for use in viewing angle property control prepared in steps S1 to S3 (step S4). Here, as shown in FIG. 26(d), the liquid crystal display panel 2 and the panel, 3, for use in viewing angle property control are vacuum-combined in a vacuum combine device while the panels 2, 3 are being combined by a UV-curing resin 301. Finally, the UV-curing resin 301 is exposed to ultraviolet rays to cure.

By these steps, the liquid crystal display device 1 in accordance with the present embodiment can be manufactured.

To have the liquid crystal display device 1 thus arranged operate in wide viewing angle property mode, as shown in FIG. 1(a), an electric field is applied to the dispersion agent 203 in the panel, 3, for use in viewing angle property control to render the agent 203 in a light-transmitting state. To have the device 1 operate in narrow viewing angle property mode, as shown in FIG. 1(b), the applied electric field is removed from the dispersion agent 203 in the panel, 3, for use in viewing angle property control to render the agent 203 in a light-diffusing state (opaque white state).

Figure 27:
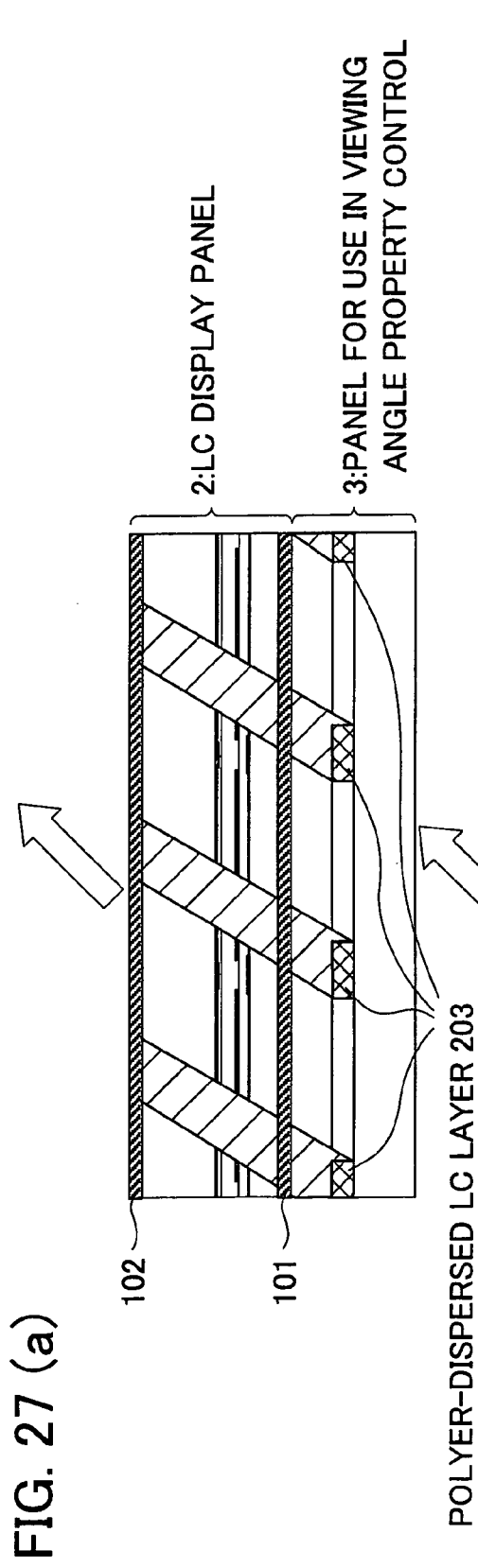
FIG. 27(a) is an illustration of a structure, as an example, when a polymer-dispersed liquid crystal is used in a panel for use in viewing angle property control.
FIG. 27(b) is an illustration of a structure, as an example, when a liquid crystal which requires the use of a polarizer is used in a panel for use in viewing angle property control.
Figure 27:
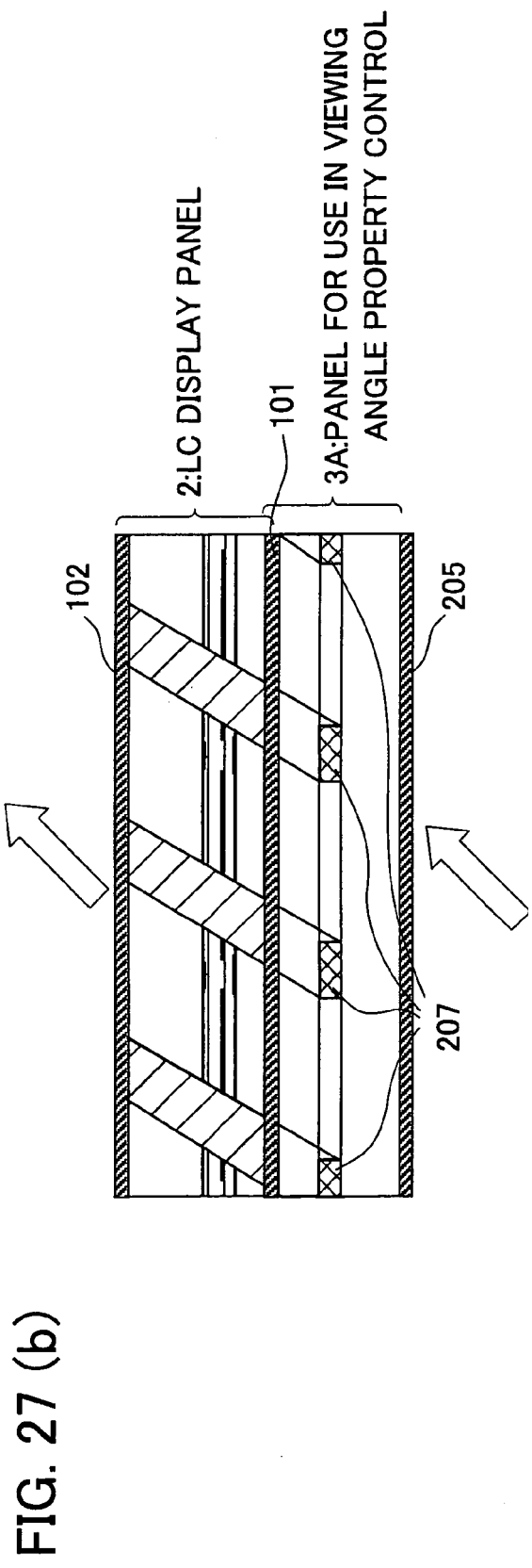

The panel, 3, for use in viewing angle property control, as shown in FIG. 27(a), has used a polymer-dispersed LC (liquid crystal) layer, switching between light scatter/light transmission, which needs no polarizer as the dispersion agent 203 in the panel, 3, for use in viewing angle property control, but is not limited to this. An alternative to the dispersion agent 203 is, as shown in FIG. 27(b), to have a LC layer 207 which needs a polarizer (the "panel, 3A, for use in viewing angle property control"). In this case, as shown in FIG. 27(b), a polarizer 205 is provided on the light-entering surface side of the panel, 3A, for use in viewing angle property control, and the polarizer 101 provided on the light-entering surface side of the liquid crystal display panel 2 is used on the light-existing surface side of the panel, 3A, for use in viewing angle property control.

In the present embodiment, as shown in FIG. 28(a), the liquid crystal display device 1 of external attachment type in which the panel, 3, for use in viewing angle property control is attached to the liquid crystal display panel 2 has been discussed. This is however not intended to be limiting the embodiment. For example, as shown in FIG. 28(b), a liquid crystal display device 1A can be an alternative in which a viewing angle property control section 3B is provided inside a liquid crystal display panel 2A.

As shown in FIG. 28(b), the liquid crystal display panel 2A is constructed of a resin layer 400 and a polymer-dispersed LC layer 203 sandwiched between a TFT substrate 100a and an opposite substrate 100b.

The resin layer 400 is an alternative to the lower TFT substrate 100a in the liquid crystal display panel 2 and formed to cause parallax with the bus lines 15 of the pixel electrodes for oblique directions.

The polymer-dispersed LC layer 203 is provided on a surface of the resin layer 400 opposite the display surface 2a of the liquid crystal display panel 2 and has the same arrangement as those areas of the panel, 3, for use in viewing angle property control in which the dispersion agent 203 is injected shown in FIG. 28(a).

Now, the following will describe the liquid crystal display panel 2 shown in FIG. 27(a) and the polarizers 101, 102, 205 for the liquid crystal display panel 2A shown in FIG. 28(b) in reference to FIG. 29(a) to FIG. 29(c).

FIG. 29(a) is a schematic cross-sectional view of the liquid crystal display panels 2, 2A. FIG. 29(b) is a plan view of the polarizer (frontal polarizer) 102 provided on the light-exiting sides of the liquid crystal display panels 2, 2A. FIG. 29(c) is a plan view of the polarizers (backside polarizers) 101, 205 provided on the light-entering sides of the liquid crystal display panels 2, 2A.

In this case, the polarizers 102, 101, 205 have been set up based on the following simulation conditions.

Incidentally, here, a liquid crystal display panel has been used in which: as shown in FIG. 29(a), the polarizer 102 as the frontal polarizer is used as the liquid crystal display panels 2, 2A, whereas the polarizer 101 or polarizer 205 is used as the backside polarizer; these frontal and backside polarizers are provided respectively with retardation films (a retardation film A plate 206a as the retardation film on the frontal polarizer side and a retardation film C plate 206b as the retardation film on the backside polarizer side); and also, the frontal and backside polarizers are placed on both sides in a normal direction of the LC (Liquid Crystal) layer 207 so that the retardation film A plate 206a positions itself opposite the retardation film C plate 206b.

As a LC material in the LC layer 207 has been used a material with a birefringence index (refractive index anisotropy) $\Delta n$ of 0.127 at a measured wavelength ($\lambda$) of 550 nm and a measured temperature of 25° C. and a dielectric anisotropy $\Delta \epsilon$ of −3.8 at a measured frequency of 1 kHz and a measured temperature of 25° C. In addition, the LC layer 207 is 3.7 μm thick (cell thickness (d)). The LC material in the LC layer 207 has a natural chiral pitch (p) of 12 μm.

In addition, as a polarizer, as discussed earlier, the polarizer 102 has been used as the frontal polarizer, and the retardation film A plate 206a has been provided on a face of the polarizer 102 opposite the LC layer 207. Incidentally, the retardation axis (optical axis) of the retardation film A plate 206a has been specified to 0°, and the retardation d·Δn by the polarizer 102 to 100 nm. In addition, as discussed earlier, the polarizer 101 or polarizer 205 has been used as the backside polarizer. The retardation film C plate 206b has been provided on a face of the backside polarizer opposite the LC layer 207. Incidentally, the retardation (Rth=d·(nx−nz) of the retardation film C plate 206b in the thickness direction has been specified to 220 nm, where nx is the refractive index of the retardation film C plate 206b in the retardation axis direction, and nz is the refractive index in the thickness (d) direction.

In addition, the polarizer absorption axes of the polarizers have been specified in the up, down, left, and right directions respectively so that the polarizer absorption axes cross at right angles (orthogonal). In addition, a white voltage has been specified to 6 V.

In addition, in the liquid crystal display device of the present invention, any given display area in the display area with wide viewing angle properties may be rendered to exhibit narrow viewing angle properties. In this case, an arrangement would be sufficient where an electric field for narrow viewing angle properties is applied to the liquid crystal in the area where displays are to be produced with narrow viewing angle properties.

Conversely, any given display area in the display area with narrow viewing angle properties may be rendered to exhibit wide viewing angle properties. In this case, an arrangement would be sufficient where an electric field for wide viewing angle properties is applied to the liquid crystal in the area where displays are to be produced with wide viewing angle properties.

In either case, it would be sufficient if only a desired display area of the LC layer 207 (liquid crystal panel) is rendered to exhibit different viewing angle properties from the remaining area based on the drive voltage generated by the drive voltage generating section 5.

As described in the foregoing, the liquid crystal display device in accordance with the present invention, although having a simple structure, is capable of switching between narrow viewing angle properties and wide viewing angle properties for the following reasons: The display device presumes the use of a liquid crystal display panel containing a liquid crystal having an alignment state which is so controlled that: a transmission intensity at an oblique viewing angle is greater than a frontal transmission intensity assuming a frontal transmittance of 1 for a white display and a transmittance of 1 at the oblique viewing angle for a white display; and a first region and a second region coexist in one or multiple picture element regions constituting a pixel, excess brightness occurring at the oblique viewing angle in the first region, no excess brightness occurring at the oblique viewing angle in the second region. The display device contains light-transmitting state setting means (light-transmitting state setting section) setting all or part of the second region to either a light-blocking state or a light-transmitting state as viewed from an oblique direction. More specifically, the light-transmitting state switching section switches all or part of the second region either to the light-blocking state or the light-transmitting state as viewed from an oblique direction.

In addition, the light-transmitting state setting means may contain a light-blocking layer switching between a light-blocking state and a light-transmitting state. The light-blocking layer may be provided below a signal line supplying a drive signal to a pixel electrode in the liquid crystal display panel.

When this is the case, even when the light-blocking layer is set to the light-blocking state, the aperture ratio of the liquid crystal display panel is not affected, because the light-blocking layer is provided below a signal line supplying a drive signal to a pixel electrode in the liquid crystal display panel.

In addition, the light-blocking layer may be a liquid crystal layer of a polymer-dispersed liquid crystal switching between a light-scattering state and a light-transmitting state.

When this is the case, no polarizers are needed, because the polymer-dispersed liquid crystal can switch between a light-scattering state and a light-transmitting state through the presence/absence of an applied electric field. Thus, the overall arrangement of the liquid crystal display panel can be simplified.

The light-transmitting state setting means may set all or part of the second region in a given area of the liquid crystal display panel to the light-blocking state.

When this is the case, a given area can be rendered to exhibit narrow viewing angle properties in a liquid crystal display panel exhibiting wide viewing angle properties. Conversely, a given area can be rendered to exhibit wide viewing angle properties in a liquid crystal display panel exhibiting narrow viewing angle properties.

Specifically, the light-transmitting state setting means only needs to set all or part of the second region in a given area of the liquid crystal display panel to the light-blocking state, while the all or part of the second region throughout the liquid crystal display panel is being set to the light-transmitting state.

In addition, the light-transmitting state setting means only needs to set all or part of the second region in a given area of the liquid crystal display panel to the light-transmitting state, while the all or part of the second region throughout the liquid crystal display panel is being set to the light-blocking state.

The liquid crystal in the liquid crystal display panel is controlled to align in radial, tilted directions, and therefore forms a radial tilted alignment state in which liquid crystal molecules are tilted in continuously changing directions. Thus, no domain dividing borders exists in the radial tilted alignment. No disclination occurs at a border, which is an advantage.

The liquid crystal in the liquid crystal display panel is alignment-controlled in four-segment domain directions. Therefore, there exist clear domain-dividing borders where defective alignments are likely to occur. Nevertheless, those areas which must be shielded from light in narrow viewing angle mode are clear because of the domain divisions, which advantageously facilitates the design process.

In addition, the liquid crystal display device may possibly be applied, for example, to the control panel of an automated teller machine, or ATM, in a bank. When this is the case, the ATM control panel may be rendered to exhibit wide viewing angle properties to display, for example, an advertisement on the display screen when the user is not making any entries and narrow viewing angle properties to block, for example, a personal identification number entry area from people standing nearby when the user is making the entry.

In addition, the present invention is preferably applied to the display device of a mobile phone, PDA (personal digital assistants), digital camera, video camera, and other electronic apparatus with a display device, or the display device connected to such electronic apparatus.

For example, when one uses the email function of a mobile phone among various other functions, he/she does not want other people to peek the display content. The liquid crystal display device, as the display device, is preferably rendered to exhibit narrow viewing angle properties.

Meanwhile, apart from telephone and email functions, some commercial mobile phones integrate large varieties of functions, including image capture (still image or movie through a camera), TV broadcast reception, and Internet access functions.

Of these functions, the image capture and TV broadcast reception functions are often meant for many people viewing the display content. The liquid crystal display device, as the display device, is preferably rendered to exhibit wide viewing angle properties.

In the mobile phone, which requires two sets of viewing angle properties, i.e. the foregoing narrow viewing angle properties and wide viewing angle properties, the liquid crystal display device which is capable of switching between wide viewing angle property mode and narrow viewing angle property mode is preferably used as in the present invention.

A specific example would be a mobile phone capable of carrying out at least two of email, image capture, Internet access, and TV broadcast reception functions and containing a liquid crystal display device producing a display of contents of functions being carried out. The liquid crystal display device includes: a liquid crystal panel with such display properties that a transmission intensity at an oblique viewing angle is greater than a frontal transmission intensity assuming a frontal transmittance of 1 for a white display and a transmittance of 1 at the oblique viewing angle for a white display; and light-transmitting state setting means (light-transmitting state setting section, light-transmitting state switching section) setting all or part of the second region to either a light-blocking state or a light-transmitting state as viewed from an oblique direction, according to the function which is carried out.

According to the arrangement, the liquid crystal display panel can be used with viewing angle properties suitable for each of the functions, by the light-transmitting state setting means switching the liquid crystal display panel between the wide viewing angle properties and the narrow viewing angle properties.

Under these circumstances, to which of the light-blocking state and the light-transmitting state the all or part of the second region is set as viewed from an oblique direction may be determined in advance for each of the functions which is being carried out.

Specifically, a memory may be provided to store information on viewing angle property mode settings for each function. All or part of the second region can thus be set to either the light-blocking state or the light-transmitting state as viewed from an oblique direction so that the panel can operate in a viewing angle mode corresponding to a function which is being executed.

Alternatively, the function itself which is being carried out may have information on a viewing angle property mode; the all or part of the second region can be set to either the light-blocking state or the light-transmitting state as viewed from an oblique direction so that the panel can operate in an appropriate viewing angle property mode to the function which is being carried out.

When this is the case, as a function is carried out, the liquid crystal display panel can be used with viewing angle properties corresponding to that function.

This allows the viewing angle properties to be set in accordance with function which is being carried out. Therefore, it is sufficient to, for example, switch between wide viewing angle properties (wide viewing angle property mode) and narrow viewing angle properties (narrow viewing angle property mode) in accordance with the function the mobile phone carries out.

In addition, viewing angle property modes may be preset so that one of the modes is selected preferably over the others for each of the functions of the mobile phone.

When this is the case, it is sufficient to assign a viewing angle property mode in advance to each function so that the panel can automatically operate in viewing angle property mode corresponding to the function which is being carried out.

As to the viewing angle property mode, the user of the mobile phone may determine a selected viewing angle property mode for each of the functions of the mobile phone.

When this is the case, it is sufficient to input a switching signal through, for example, various function setting keys on the mobile phone to select a viewing angle property mode for each of the functions and set the panel to operate in that mode.

In addition, the select viewing angle property mode may be switched to any given viewing angle property mode while one of the functions of the mobile phone is being carried out.

Further, the mobile phone may be adapted to preferably select narrow viewing angle property mode for the panel to work in that mode when the Internet access function is being carried out.

This prevents other people from peeking the content accessed over the Internet.

In addition, the mobile phone may be adapted to preferably select narrow viewing angle property mode for the panel to work in that mode when the email function is being carried out.

Further, the mobile phone may be adapted to preferably select wide viewing angle property mode for the panel to work in that mode when image capture function is being carried out.

In addition, the mobile phone may be adapted to preferably select narrow viewing angle property mode for the panel to work in that mode when the TV broadcast reception function is being carried out.

That is, the light-transmitting state setting means may be adapted to set the all or part of the second region to the light-blocking state as viewed from an oblique direction when the Internet access and email functions are being carried out.

Further, the light-transmitting state setting means may be adapted to set the all or part of the second region to the light-transmitting state as viewed from an oblique direction when the image capture function is being carried out.

The above description applies not only to the mobile phone, but other multifunctional mobile terminals like the PDA. That is, with the word "mobile phone" being replaced with "PDA," similar functions and effects are achieved with the PDA.

In addition, when the switch control of the display properties (wide viewing angle properties, narrow viewing angle properties) is done, the control may be done with additional area ratio grayscale. Applying an area ratio grayscale method to the control for the switching between different sets of wide viewing angle properties in this manner forces oblique display properties to approach the front face display properties. Therefore, the display quality of the liquid crystal display panels 2, 2A exhibiting wide viewing angle properties can be improved. That is, if area ratio grayscale is implemented when the panel is exhibiting wide viewing angle properties, the liquid crystal display panels 2, 2A come to exhibit even wider viewing angle properties, enhancing the effects of the viewing angle properties switching.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The embodiments and examples described above are for illustrative purposes only and by no means limit the scope of the present invention. Variations are not to be regarded as a departure from the spirit and scope of the invention, and all such modifications as would be obvious to one skilled in the art are intended to be included within the scope of the claims below.

What is claimed is:

1. A liquid crystal display device, comprising:
    a liquid crystal display panel containing a first liquid crystal layer having an alignment state which is so controlled that: a transmission intensity at an oblique viewing angle is greater than a frontal transmission intensity assuming a frontal transmittance of 1 for a white display and a transmittance of 1 at the oblique viewing angle for a white display; and a first region and a second region coexist in a pixel, wherein the first region and the second region comprise one or multiple picture element regions constituting the pixel, excess brightness occurring at the oblique viewing angle in the first region, no excess brightness occurring at the oblique viewing angle in the second region; and
    light-transmitting state setting means setting all or part of the second region to either a light-blocking state or a light-transmitting state as viewed from an oblique direction, wherein
    the light-transmitting state setting means contains a second liquid crystal layer that is a light-blocking layer switching between a light-blocking state and a light-transmitting state by application of an electric field, wherein
    the light-transmitting state setting means containing the second liquid crystal layer is provided inside the liquid crystal display panel so that said first liquid crystal layer is between the light-transmitting state setting means and a display surface, wherein
    the light-transmitting state setting means comprises rib sections arranged in a matrix and said second liquid crystal located between the rib sections, wherein,
    the rib sections comprise organic resin, and the liquid crystal located between the rib sections switches between light-transmitting state and light-blocking state.

2. The liquid crystal display device as set forth in claim 1, wherein the light-transmitting state setting means sets the all or part of the second region to either the light-blocking state or the light-transmitting state as viewed from the oblique direction in accordance with a viewing angle property switching signal.

3. The liquid crystal display device as set forth in claim 1, wherein the light-blocking layer is a liquid crystal layer of a polymer-dispersed liquid crystal switching between a light-scattering state and a light-transmitting state by application of an electric field.

4. The liquid crystal display device as set forth in claim 1, wherein the light-transmitting state setting means is a light-transmitting state switching section switching the all or part of the second region to either the light-blocking state or the light-transmitting state as viewed from the oblique direction.

5. The liquid crystal display device as set forth in claim 1, wherein the light-transmitting state setting means contains a light-blocking layer switching between a light-blocking state and a light-transmitting state, the light-blocking layer being provided below a signal line supplying a drive signal to a pixel electrode in the liquid crystal display panel.

6. The liquid crystal display device as set forth in claim 5, wherein the light-blocking layer is a liquid crystal layer of a polymer-dispersed liquid crystal switching between a light-scattering state and a light-transmitting state.

7. The liquid crystal display device as set forth in claim 1, wherein the light-transmitting state setting means sets all or part of the second region in a given area of the liquid crystal display panel to the light-blocking state.

8. The liquid crystal display device as set forth in claim 1, wherein the light-transmitting state setting means sets all or part of the second region in a given area of the liquid crystal display panel to the light-blocking state, with the all or part of the second region throughout the liquid crystal display panel being set to the light-transmitting state.

9. The liquid crystal display device as set forth in claim 1, wherein the light-transmitting state setting means sets all or part of the second region in a given area of the liquid crystal display panel to the light-transmitting state, with the all or part of the second region throughout the liquid crystal display panel being set to the light-blocking state.

10. The liquid crystal display device as set forth in claim 1, wherein the liquid crystal in the liquid crystal display panel is alignment-controlled in radial, tilted directions.

11. The liquid crystal display device as set forth in claim 1, wherein the liquid crystal in the liquid crystal display panel is alignment-controlled in four-segment domain directions.

12. The liquid crystal display device as set forth in claim 1, wherein the light-transmitting state setting means is provided on a surface of the liquid crystal display panel opposite a display surface thereof, is a panel for use in viewing angle property control which controls viewing angle properties of the display surface of the liquid crystal display panel, and contains an area showing a light-blocking state in absence of an applied electric field and a light-transmitting state in presence of an applied electric field.

13. The liquid crystal display device as set forth in claim 1, wherein:
    the light-transmitting state setting means contains: a resin layer formed so as to cause parallax with a signal line supplying a drive signal to a pixel electrode in the liquid crystal display panel; and a light-blocking layer, provided on a surface of the resin layer opposite a display surface of the liquid crystal display panel, switching between a light-blocking state and a light-transmitting state by application of an electric field.

14. An electronic apparatus, comprising a liquid crystal display device including:
    a liquid crystal display panel containing a first liquid crystal layer having an alignment state which is so controlled that: a transmission intensity at an oblique viewing angle is greater than a frontal transmission intensity assuming a frontal transmittance of 1 for a white display and a transmittance of 1 at the oblique viewing angle for a white display; and a first region and a second region coexist in a pixel, wherein the first region and the second region comprise one or multiple picture element regions constituting the pixel, excess brightness occurring at the oblique viewing angle in the first region, no excess brightness occurring at the oblique viewing angle in the second region; and
    light-transmitting state setting means setting all or part of the second region to either a light-blocking state or a light-transmitting state as viewed from an oblique direction, wherein the light-transmitting state setting means contains a second liquid crystal layer that is a light-blocking layer switching between a light-blocking state and a light-transmitting state by application of an electric field, wherein the light-transmitting state setting means containing the second liquid crystal layer is provided inside the liquid crystal display panel so that said first liquid crystal layer is between the light-transmitting state setting means and a display surface, wherein the light-transmitting state setting means comprises rib sections arranged in a matrix and said second liquid crystal located between the rib sections, wherein, the rib sections comprise organic resin, and the liquid crystal located between the rib sections switches between light-transmitting state and light-blocking state.

15. An electronic apparatus capable of carrying out at least two of email, image capture, Internet access, and TV broadcast reception functions, the apparatus containing a liquid crystal display device producing a display of contents of functions being carried out, the liquid crystal display device including:

a liquid crystal display panel containing a first liquid crystal layer having an alignment state which is so controlled that: a transmission intensity at an oblique viewing angle is greater than a frontal transmission intensity assuming a frontal transmittance of 1 for a white display and a transmittance of 1 at the oblique viewing angle for a white display; and a first region and a second region coexist in a pixel, wherein the first region and the second region comprise one or multiple picture element regions constituting the pixel, excess brightness occurring at the oblique viewing angle in the first region, no excess brightness occurring at the oblique viewing angle in the second region; and light-transmitting state setting means setting all or part of the second region to either a light-blocking state or a light-transmitting state as viewed from an oblique direction, according to the function which is carried out, wherein the light-transmitting state setting means contains a second liquid crystal layer that is a light-blocking layer switching between a light-blocking state and a light-transmitting state by application of an electric field, wherein the light-transmitting state setting means containing the second liquid crystal layer is provided inside the liquid crystal display panel so that said first liquid crystal layer is between the light-transmitting state setting means and a display surface, wherein the light-transmitting state setting means comprises rib sections arranged in a matrix and said second liquid crystal located between the rib sections, wherein, the rib sections comprise organic resin, and the liquid crystal located between the rib sections switches between light-transmitting state and light-blocking state.

16. The electronic apparatus as set forth in claim 15, wherein the electronic apparatus is capable of at least one of the Internet access and email functions and at least one of the image capture and TV broadcast reception functions.

17. The electronic apparatus as set forth in claim 15, wherein to which of the light-blocking state and the light-transmitting state the all or part of the second region is set as viewed from the oblique direction is determined in advance for each of functions which is being carried out.

18. The electronic apparatus as set forth in claim 15, wherein the light-transmitting state setting means sets the all or part of the second region to the light-blocking state as viewed from the oblique direction when the Internet access or email functions are carried out.

19. The electronic apparatus as set forth in claim 15, wherein the light-transmitting state setting means sets the all or part of the second region to the light-transmitting state as viewed from the oblique direction when the image capture functions are carried out.

20. The liquid crystal display device as set forth in claim 1, wherein each layer of the second liquid crystal layer between the rib sections switches between said light-blocking state and said light-transmitting state by application of said electric field.

21. The electronic apparatus as set forth in claim 14, wherein each layer of the second liquid crystal layer between the rib sections switches between said light-blocking state and said light-transmitting state by application of said electric field.

22. The electronic apparatus as set forth in claim 15, wherein each layer of the second liquid crystal layer between the rib sections switches between said light-blocking state and said light-transmitting state by application of said electric field.

* * * * *